United States Patent
Cui et al.

(10) Patent No.: US 11,320,834 B2
(45) Date of Patent: May 3, 2022

(54) METHODS AND SYSTEMS FOR MAPPING, LOCALIZATION, NAVIGATION AND CONTROL AND MOBILE ROBOT

(71) Applicants: ANKOBOT (SHENZHEN) SMART TECHNOLOGIES CO., LTD., Shenzhen (CN); ANKOBOT (SHANGHAI) SMART TECHNOLOGIES CO., LTD., Shanghai (CN)

(72) Inventors: Yuwei Cui, Shanghai (CN); Chongxing Li, Shanghai (CN)

(73) Assignees: ANKOBOT (SHENZHEN) SMART TECHNOLOGIES CO., LTD., Shenzhen (CN); ANKOBOT (SHANGHAI) SMART TECHNOLOGIES CO., LTD., Shanghai (CN)

( * ) Notice: Subject to any disclaimer, the term of this patent is extended or adjusted under 35 U.S.C. 154(b) by 290 days.

(21) Appl. No.: 16/532,552

(22) Filed: Aug. 6, 2019

(65) Prior Publication Data
US 2020/0159246 A1    May 21, 2020

Related U.S. Application Data

(63) Continuation of application No. PCT/CN2018/116251, filed on Nov. 19, 2018.

(51) Int. Cl.
*G05D 1/02*   (2020.01)
*A47L 9/28*   (2006.01)

(52) U.S. Cl.
CPC .......... *G05D 1/0251* (2013.01); *A47L 9/2815* (2013.01); *G05D 1/027* (2013.01);
(Continued)

(58) Field of Classification Search
None
See application file for complete search history.

(56) References Cited

U.S. PATENT DOCUMENTS

| | | | | |
|---|---|---|---|---|
| 2006/0041331 A1* | 2/2006 | Myeong | ................. | G06N 3/126 700/245 |
| 2006/0196003 A1* | 9/2006 | Song | .................... | G05D 1/0259 15/319 |

(Continued)

FOREIGN PATENT DOCUMENTS

| | | |
|---|---|---|
| CN | 103903253 A | 7/2014 |
| CN | 107449427 A | 12/2017 |

(Continued)

OTHER PUBLICATIONS

CN 2018800024286 Search Report dated May 23, 2021 By China IPO.
PCT/CN2018/116251 PCT ISR ISA210 and ISA237.

*Primary Examiner* — Jeff A Burke
*Assistant Examiner* — Arslan Azhar
(74) *Attorney, Agent, or Firm* — IPro, PLLC

(57) ABSTRACT

The present application provides methods and systems for mapping, localization, navigation and control and a mobile robot. Through the technical solution of acquiring a first projected image and second projected image of an entity object when the mobile robot moves to a first position and a second position respectively, building a map or localizing the mobile robot based on angle information of the entity object relative to the mobile robot at the first position and at the second position, the first position and the second position, planning a navigation route based on the built map and localization, and controlling the mobile robot to move along the navigation route, position information of the entity object can be determined precisely, and precision of the built map can be improved. Moreover, movement of the mobile (Continued)

robot can be controlled precisely, and operating precision of the mobile robot and human-computer interaction can be improved.

17 Claims, 9 Drawing Sheets

(52) U.S. Cl.
CPC ......... *G05D 1/0219* (2013.01); *G05D 1/0221* (2013.01); *G05D 2201/0215* (2013.01)

(56) References Cited

U.S. PATENT DOCUMENTS

| | | |
|---|---|---|
| 2007/0267570 A1 | 11/2007 | Park et al. |
| 2011/0164832 A1 | 7/2011 | Yoon et al. |
| 2012/0281507 A1* | 11/2012 | Rikoski ................ G01C 21/005 367/88 |
| 2015/0071524 A1* | 3/2015 | Lee ...................... G06K 9/4671 382/154 |
| 2015/0369609 A1* | 12/2015 | Roumeliotis ........ G01C 21/165 701/532 |
| 2017/0010623 A1* | 1/2017 | Tang ........................ G01C 3/00 |
| 2017/0329333 A1* | 11/2017 | Passot .................. G05D 1/0231 |
| 2018/0051990 A1* | 2/2018 | Takeuchi .............. G01S 17/931 |
| 2018/0098200 A1* | 4/2018 | Ishiyama .................. G06T 7/60 |
| 2019/0005669 A1* | 1/2019 | Jiang ........................ G06T 7/80 |
| 2019/0145775 A1* | 5/2019 | Cui ........................ G06F 16/29 701/446 |
| 2019/0212752 A1* | 7/2019 | Fong ........................ G06K 9/00 |

FOREIGN PATENT DOCUMENTS

| | | |
|---|---|---|
| CN | 107680135 A | 2/2018 |
| CN | 107907131 A | 4/2018 |
| CN | 107928566 A | 4/2018 |
| CN | 107943037 A | 4/2018 |
| CN | 108125622 A | 6/2018 |
| CN | 108132666 A | 6/2018 |
| CN | 108139758 A | 6/2018 |
| CN | 108256430 A | 7/2018 |

\* cited by examiner

METHODS AND SYSTEMS FOR MAPPING, LOCALIZATION, NAVIGATION AND CONTROL AND MOBILE ROBOT

RELATED APPLICATION

This application is a continuation application of International Patent Application No. PCT/CN2018/116251, filed Nov. 19, 2018, the entire contents of which are hereby incorporated by reference.

TECHNICAL FIELD

The present application relates to the technical field of navigation control of an autonomous robot, in particular to methods and systems for mapping, localization, navigation and control and a mobile robot.

BACKGROUND

Mobile robots are mechanical devices that perform work automatically. It can not only receive human command, run pre-programmed procedures, but can also act according to principles and programs based on artificial intelligence technology. This type of mobile robot can be used indoors or outdoors, in industry or family. It can replace security patrol, human cleaning the ground, and it also can be used in family companion, office assistance, etc.

Based on the visual information that the visual sensor provides and the mobile information that the mobile sensor provides, on the one hand, the mobile robot can build a map of the situation where the mobile robot locates, on the other hand, the mobile robot can provide service for route planning, route adjusting and navigating based on the map, which makes the mobile robot moves more efficiently. In practical applications, a mobile robot determines its current position according to position information provided by a mobile sensor, and the mobile robot can localize its current position based on identified image features which are contained in a single image captured by an image acquisition device, in view of this, the image features captured at the current position can be corresponding with the stored matching image features, and based on the position of the matching image features in a map, the mobile robot can be localized quickly. However, through similar localization methods, the position of the mobile robot in a map cannot be accurately localized.

SUMMARY

In view of the above shortcomings of the existing technology, the objective of the present application is to provide methods and systems for mapping, localization, navigation, control and a mobile robot, solve the problem that entity objects cannot be localized precisely in the existing technology.

In one aspect, the present application provides a mobile robot. The mobile robot comprises an image acquisition device, arranged on the mobile robot, and configured to capture entity objects within a field of view of the image acquisition device at a position where the mobile robot is located to obtain projected images, the projected images are on a plane which is parallel with a moving plane of the mobile robot; a movement device, arranged on the mobile robot, and configured to adjust a position and a pose of the mobile robot in a controlled manner; a first processing device, connected with the image acquisition device, and configured to run at least one program so as to perform a navigation method; and a second processing device, connected with the first processing device and the movement device, and configured to run at least one program so as to control the movement device to adjust the position and pose of the mobile robot based on a navigation route provided by the first processing device, such that the mobile robot moves autonomously according to the navigation route; wherein the navigation method performed by the first processing device comprises the following steps: acquiring a first projected image when the mobile robot moves to a first position and acquiring a second projected image when the mobile robot moves to a second position; determining projection position information of an entity object in the moving plane based on a first angle information of the entity object relative to the mobile robot at the first position, a second angle information of the entity object relative to the mobile robot at the second position, the first position and the second position, wherein the entity object is a same entity object which is identified from the first projected image and the second projected image; marking the determined projection position information of the entity object on a preset map; and planning a navigation route based on the map, and providing the navigation route to the second processing device.

In some embodiments, the navigation method performed by the first processing device further comprises the following steps: identifying a target region corresponding to the same entity object in the first projected image and the second projected image respectively based on multiple preset entity object information, and marking the identified entity object information on the map.

In some embodiments, the step of identifying a target region corresponding to the same entity object in the first projected image and the second projected image respectively based on multiple preset entity object information comprises at least one of the following steps: identifying the target region corresponding to the same entity object in the first projected image and the second projected image respectively based on preset feature information corresponding to multiple entity object information; performing a mapping process on the target region corresponding to the same entity object in the first projected image and the second projected image with the multiple preset entity object information respectively, by using a preset image recognition algorithm.

In some embodiments, the navigation method performed by the first processing device further comprises at least one of the following steps: identifying a second target region in the second projected image through performing an image tracking technique on a first target region identified in the first projected image, so as to obtain target regions corresponding to the same entity object in two projected images; matching target regions with the same target feature in the first projected image and the second projected image, so as to obtain target regions corresponding to the same entity object in two projected images.

In some embodiments, the navigation method performed by the first processing device further comprises a step of acquiring pose information of the movement device when the mobile robot is at the first position and the second position respectively, and obtaining relative pose change information of the mobile robot between the first position and the second position; correspondingly, the step of determining projection position information of an entity object on the moving plane based on a first angle information of the entity object relative to the mobile robot at the first position, a second angle information of the entity object relative to the mobile robot at the second position, the first position and the second position comprises: compensating an angular deviation of the second angle information based on the relative pose change information; and determining the projection position information of the entity object in the moving plane based on the first angle information, the compensated second angle information, the first position, and the second position.

In some embodiments, the step of determining projection position information of an entity object in the moving plane comprises: constructing a geometrical relationship in the moving plane based on the first angle information, the second angle information, the first position and the second position; and determining the projection position information of the entity object in the moving plane according to the constructed geometrical relationship.

In some embodiments, the first processing device is further configured to perform the following steps when the mobile robot moves between the first position and the second position: measuring relative position information of the mobile robot which moves between the first position and the current position based on movement information of the mobile robot; and determining the second position based on the measured relative position information and acquiring corresponding second projected image.

In some embodiments, the navigation method performed by the first processing device further comprises: during movement of the mobile robot, for the identified same entity object, the above steps of acquiring two projected images and determining projection position information of the entity object are performed for multiple times, so as to obtain at least two projection position information of the same entity object which is obtained through performing the above steps each time; and performing an error correction on the obtained at least two projection position information of the same entity object, so as to mark the corrected projection position information on the preset map.

In some embodiments, the mobile robot is a cleaning robot; and the step of planning a navigation route based on the map comprises: planning a navigation route which traverse a cleaning region covering the corresponding entity objects according to the entity object information and the projection position information thereof marked on the map.

In some embodiments, a principal optic axis of the image acquisition device is vertical to the moving plane.

In another aspect, the present application provides a mobile robot. The mobile robot comprises: an image acquisition device, arranged on the mobile robot, and configured to capture entity objects within a field of view of the image acquisition device at a position where the mobile robot is located to obtain projected images, the projected images are on a plane which is parallel with a moving plane of the mobile robot; a movement device, arranged on the mobile robot, and configured to adjust a position and a pose of the mobile robot in a controlled manner; a first processing device, connected with the image acquisition device, and configured to run at least one program so as to perform a navigation method; a second processing device, connected with the first processing device and the movement device, and configured to run at least one program so as to control the movement device to adjust the position and pose of the mobile robot based on a navigation route provided by the first processing device, such that the mobile robot moves autonomously according to the navigation route; wherein the navigation method performed by the first processing device comprises the following steps: acquiring a first projected image when the mobile robot moves to a first position and acquiring a second projected image when the mobile robot moves to a second position, wherein the first projected image and the second projected image comprises a target region projected by a same entity object which is marked on a map respectively; determining localization information of the mobile robot in the moving plane based on a first angle information of the same entity object relative to the mobile robot at the first position, a second angle information of the same entity object relative to the mobile robot at the second position, the first position and the second position, wherein the same entity object is an entity object which is identified from the first projected image and the second projected image respectively; and planning a navigation route based on the localization information and the map marked with projection position information of entity objects, and providing the navigation route to the second processing device.

In some embodiments, the navigation method performed by the first processing device further comprises the following steps: identifying a target region corresponding to the same entity object in the first projected image and the second projected image respectively based on multiple preset entity object information; and determining position information of the identified entity object information on the map.

In some embodiments, the step of identifying a target region corresponding to the same entity object in the first projected image and the second projected image respectively based on multiple preset entity object information comprises at least one of the following steps: identifying the target region corresponding to the same entity object in the first projected image and the second projected image respectively based on preset feature information corresponding to multiple entity object information; performing a mapping process on the target region corresponding to the same entity object in the first projected image and the second projected image with the multiple preset entity object information respectively, by using a preset image recognition algorithm.

In some embodiments, the navigation method performed by the first processing device further comprises at least one of the following steps: identifying a second target region in the second projected image through performing an image tracking technique on a first target region identified in the first projected image, so as to obtain target regions corresponding to the same entity object in two projected images; matching target regions with the same target feature in the first projected image and the second projected image, so as to obtain target regions corresponding to the same entity object in two projected images.

In some embodiments, the navigation method performed by the first processing device further comprises a step of acquiring pose information of the movement device when the mobile robot is at the first position and the second position respectively, and obtaining relative pose change information of the mobile robot between the first position and the second position; correspondingly, the step of determining localization information of the mobile robot on the moving plane based on a first angle information of the same entity object relative to the mobile robot at the first position, a second angle information of the same entity object relative to the mobile robot at the second position, the first position and the second position comprises: compensating an angular deviation of the second angle information based on the relative pose change information; and determining the localization information of the mobile robot on the moving plane based on the first angle information, the compensated second angle information, the first position, and the second position.

In some embodiments, the step of determining localization information of the mobile robot on the moving plane comprises: constructing a geometrical relationship in the moving plane based on the first angle information, the second angle information, and relative position information between the first position and the second position; and determining the localization information of the mobile robot on the moving plane according to the constructed geometrical relationship.

In some embodiments, the first processing device is further configured to perform the following steps when the mobile robot moves from the first position to the second position: measuring relative position information of the mobile robot which moves between the first position and the current position based on the movement information of the mobile robot; and determining the second position based on the relative position information and acquiring corresponding second projected image.

In some embodiments, the navigation method performed by the first processing device further comprises: for the identified same entity object, the first position and the captured first projected image, instructing the mobile robot to capture corresponding second projected image respectively at multiple second positions, and the above steps of determining the localization information of the mobile robot at the first position are performed respectively based on the first projected image at the first position and each second projected image captured respectively at multiple second positions, so as to obtain at least two localization information corresponding to the first position of the mobile robot which is obtained through performing the above steps each time; performing an error correction on the obtained at least two localization information corresponding to the first position of the mobile robot, so as to obtain the localization information of the mobile robot at the first position; and based on determined localization position of the mobile robot at the first position, determining localization information of the mobile robot at the current position.

In some embodiments, the map comprises entity object information and projection position information thereof; and the step of planning a navigation route based on the localization information and the map comprises at least one of the following steps: based on instruction information containing entity object information, planning a navigation route from a position indicated by the localization information to the entity object; and based on the localization information of the mobile robot and each entity object information marked on the map, planning a navigation route along which the mobile robot moves from the position indicated by the localization information and passes by at least one entity object.

In some embodiments, the mobile robot is a cleaning robot; and the step of planning a navigation route based on the map comprises: planning a navigation route which traverse a cleaning region covering the corresponding entity objects according to the entity object information and the projection position information thereof marked on the map.

As mentioned above, the methods and systems for mapping, localization, navigation and control and a mobile robot of the present application have the following beneficial effects: through the technical solution of acquiring a first projected image and a second projected image of an entity object on a plane where the mobile robot moves (i.e., moving plane) when the mobile robot moves to a first position and a second position respectively, building a map or localizing the mobile robot based on a first angle information of the entity object relative to the mobile robot at the first position, a second angle information of the entity object relative to the mobile robot at the second position, the first position and the second position, wherein the entity object is a same entity object which is identified from the first projected image and the second projected image, and planning a navigation route based on the built map and the localization, and then controlling the mobile robot to move along the navigation route, position information of the entity object can be determined precisely based on two images at two different positions, and precision of the built map can be improved. Moreover, a navigation route is planned according to precise localization information of the mobile robot, movement of the mobile robot can be controlled precisely, and operating precision of the mobile robot and human-computer interaction can be improved.

DETAILED DESCRIPTION

Figure 1:
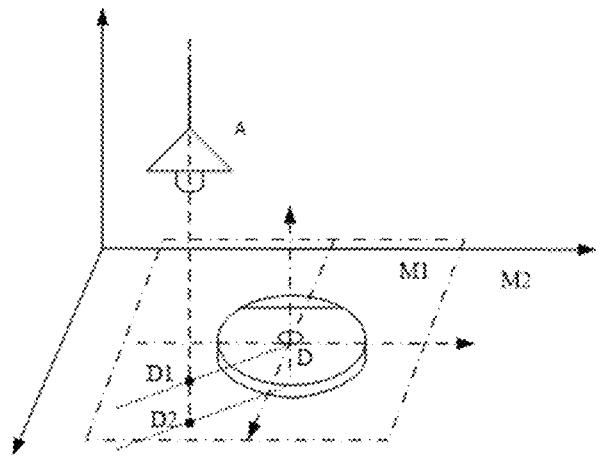
FIG. 1 is a schematic diagram showing a mobile robot and an entity object A in a corresponding physical space when the mobile robot captures the entity object A.

Implementations of the present application will be described below through specific embodiments, and those skilled in the art can easily understand other advantages and effects of the present application from the contents disclosed in the present specification.

Moreover, as used herein, such single forms as "one", "a" and "the" aim at also including the plural forms, unless contrarily indicated in the text. It should be further understood that, such terms as "comprise" and "include" indicate the existence of the features, steps, operations, elements, components, items, types and/or groups, but do not exclude the existence, emergence or addition of one or more other features, steps, operations, elements, components, items, types and/or groups. The terms "or" and "and/or" used herein are explained to be inclusive, or indicate any one or any combination. Therefore, "A, B or C" or "A, B and/or C" indicates "any of the following: A; B; C; A and B; A and C; B and C; A, B and C". Exceptions of the definition only exist when the combinations of elements, functions, steps or operations are mutually exclusive inherently in some ways.

Mobile robots perform mobile operations based on navigation control technology. Affected by the situation of mobile robots, when they are in an unknown location of an unknown environment, mobile robots build maps and perform navigation operations based on VSLAM (Visual Simultaneous Localization and Mapping) technology. Specifically, mobile robots construct maps through visual information provided by visual sensors and mobile information provided by movement sensors, and navigate and move independently based on the map. Wherein, the visual sensors include, for example, a camera device. The movement sensors for example include speed sensor, odometer sensor, distance sensor, cliff sensor, etc. The mobile robot moves on the plane where it moves (i.e. moving plane), acquiring and storing images that entity objects projected onto the moving plane. The image acquisition device captures entity objects in the field of view at the location of the mobile robot and projects them to the moving plane, so as to obtain the projection images. The entity objects include, for example, a TV set, an air conditioner, a chair, shoes, a leather ball, etc. In practical applications, a mobile robot can determine its current position according to position information provided by a mobile sensor, and the mobile robot can localize its current position based on identified image features which are contained in a single image captured by an image acquisition device, in view of this, the image features captured at the current position can be corresponding with the stored matching image features, and based on the position of the matching image features in a map, the mobile robot can be localized quickly. However, through similar localization methods, the position of the mobile robot in a map cannot be accurately localized.

For this reason, the present application provides a method of map building used in a mobile robot. Through the method of map building, entity objects captured within a field of view of an image acquisition device can be precisely mapped to a map used by the mobile robot, so that a map used for the mobile robot to plan a navigation route is built based on the localized entity objects. Wherein the entity object includes any physical entity which can be captured in a physical space where the mobile robot moves, which includes but is not limited to: ball, shoe, wall, flowerpos, clothe and hat, roof, lamp, tree, table, chair, refrigerator, television, sofa, sock, tiled object, cup, etc. Wherein, the tiled object includes but is not limited to ground mat or floor tile map paved on the floor, and tapestry and picture hung on a wall. The image acquisition device includes but is not limited to: fisheye camera module, wide angle (or non-wide angle) camera module or any of them. The mobile robot includes, but is not limited to, a family companion mobile robot, a cleaning robot, a patrol mobile robot, a glass cleaning robot, etc Herein, the mobile robot includes at least one image acquisition device. The image acquisition device captures entity objects within a field of view of the image acquisition device at a position where a mobile robot is located to obtain projected images, the projected images are on a plane which is parallel with a moving plane of the mobile robot. For example, a mobile robot includes an image acquisition device which is arranged on the top, shoulder or back of the mobile robot, and the principal optic axis of the image acquisition device is vertical to a moving plane of the mobile robot. For another example, a mobile robot includes several image acquisition devices, and the principal optic axis of one of the image acquisition devices is vertical to a moving plane of the mobile robot.

Since the principal optic axis of the image acquisition device is vertical to a moving plane, a plane where a two-dimensional image captured by the image acquisition device is located is in parallel with the moving plane. Please refer to FIG. 1 which is a schematic diagram showing a mobile robot and an entity object A in a corresponding physical space when the mobile robot captures the entity object A. When the image acquisition device captures a projected image, the captured entity object A is projected to a position D1 in the projected image M1, and the same entity object A is projected to a position D2 on the moving plane M2, wherein the position relationship between position D1 and the mobile robot's position D is the same as the relationship between position D2 and D. In a similar way, a position of the entity object in a projected image captured by an image acquisition device is used to represent a position where the entity object is projected to a moving plane of the mobile robot, and an angle of the position of the entity object in the projected image relative to a moving direction of the mobile robot is used to represent an angle of the position where the entity object is projected to a moving plane of the mobile robot relative to the moving direction of the mobile robot.

Figure 2A:
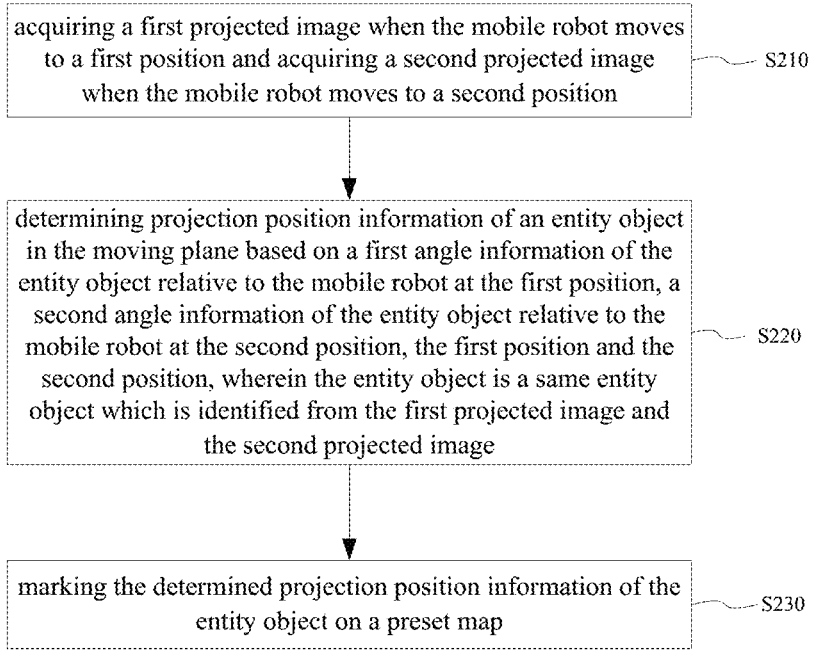
FIG. 2A shows a flow diagram of a method for mapping of the present application in one embodiment.

Based on the above features, please refer to FIG. 2A which shows a flow diagram of a method for mapping of the present application in one embodiment. Wherein the method for mapping can be performed by a processing device of a mobile robot. Wherein the processing device is an electronic device which is capable of performing numeric calculation, logical calculation and data analysis, and the processing device includes but is not limited to: CPU, GPU, FPGA, etc. and volatile memory for temporarily storing intermediate data generated during operations and so on.

In step S210, a first projected image is acquired when the mobile robot moves to a first position and a second projected image is acquired when the mobile robot moves to a second position, wherein two projected images selected by the processing device contain the captured same entity object.

In some embodiments, the processing device acquires a first projected image at a first position and a second projected image at a second position, wherein, the first position and the second position are within a range in which a distance between the first position and the second position is shorter than a diameter defined by a field of view of the image acquisition device.

For example, during the movement of the mobile robot, the image acquisition device captures images with a time interval preset by the processing device, and the processing device acquires static images captured at different time by the image acquisition device and the corresponding first position and the second position when static images are captured; wherein the time interval is at least shorter than the time period during which the mobile robot moves a diameter of one field of view. For another example, the image acquisition device can capture video. Since video is constituted by image frames, during the movement of the mobile robot, the processing device continuously or discontinuously collects image frames in the acquired video, and selects two of the image frames as two projected images, and acquires correspondingly the first position and the second position, wherein the selected two-frame images have fields of view which are partially overlapped with each other.

For another example, the mobile robot instructs the image acquisition device to capture projected images of entity objects within a field of view of the image acquisition device with a preset time period, then the processing device acquires projected images captured by the image acquisition device at different time, and selects two of the projected images as a first projected image and a second projected image. The position at which the image acquisition device captures the first projected image is the first position, while the position at which the image acquisition device captures the second projected image is the second position. Wherein the time period is represented by a time unit, or the time period is represented by number of image frame interval.

For another example, the mobile robot is in communication with an intelligent terminal, and the intelligent terminal can modify the time period through a specific APP. For example, after running the APP, a modified interface of the time period is displayed on the touch screen of the intelligent terminal, and the time period is modified through a touch operation on the modified interface; for another example, a time period modification instruction is directly sent to the mobile robot to modify the time period. The time period modification instruction can be for example a voice containing a modification instruction, and the voice can be for example "the period is modified to be three seconds". For yet another example, the voice can be "the number of image frame interval is modified to be five".

In yet some other embodiments, the processing device determines to select a first projected image at a first position and a second projected image and a second position on the basis that the two projected images have a common target region. Herein, while performing step S210, or without any necessary sequence, the processing device further performs at least one of the following steps S211 and S212.

Figure 2B:
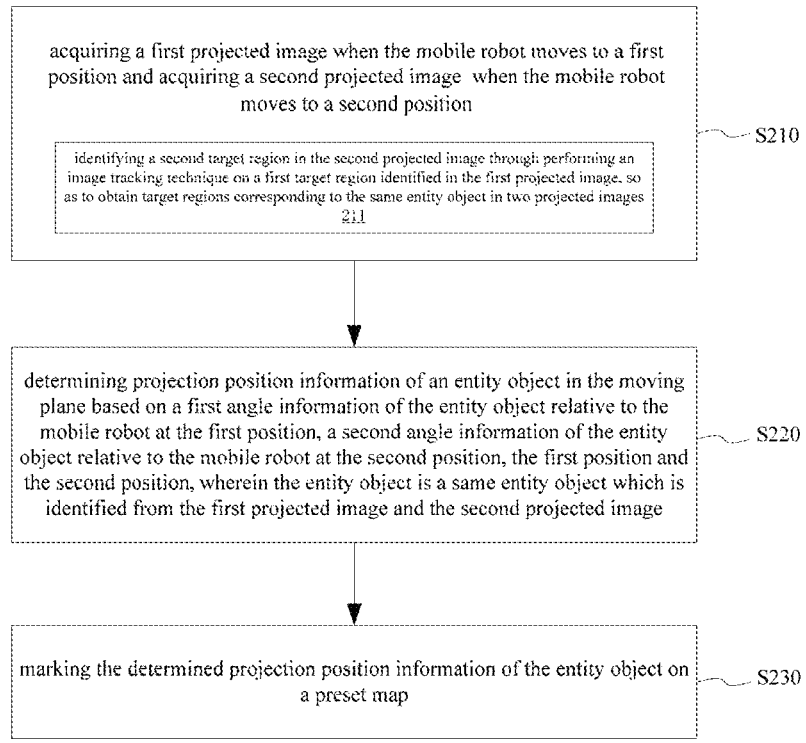
FIG. 2B shows a flow diagram of a method for mapping of the present application in another embodiment.

Please refer to FIG. 2B which shows a flow diagram of a method for mapping of the present application in another embodiment, in step S211, based on a first target region identified in a first projected image and by using an image tracking technique, a corresponding second target region is identified in a second projected image, so that target regions corresponding to the same entity object in two projected images are obtained, hence the second projected image and the corresponding second position are acquired.

Herein, the processing device obtains an image feature in the first projected image through an image processing algorithm, determines the first target region based on the image feature, tracks at least one projected image captured by the image acquisition device through an image tracking technique after the first projected image is captured, and when the image feature is still found in the second projected image captured at the second position by continuous tracking, the first projected image at the first position and the second projected image at the second position are respectively acquired, and the tracked image feature is determined to be the same entity object. Wherein the image feature includes preset graphic feature corresponding to entity object type, or image feature obtained through an image processing algorithm. Wherein the image processing algorithm includes but is not limited to at least one of the followings: grayscale processing, sharpening processing, contour extraction, corner extraction, line extraction, and image processing algorithm through machine learning. Image processing algorithm through machine learning includes but is not limited to: neural network algorithm and clustering algorithm.

Figure 2C:
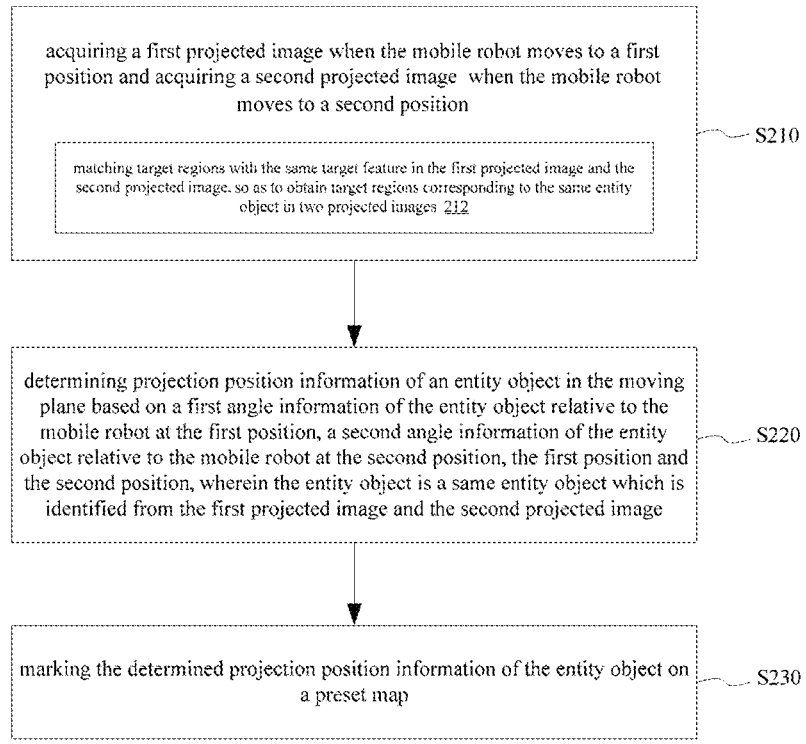
FIG. 2C shows a flow diagram of a method for mapping of the present application in yet another embodiment.

Please refer to FIG. 2C which shows a flow diagram of a method for mapping of the present application in yet another embodiment, in step S212, target regions with the same target feature in the first projected image and the second projected image are matched, so that target regions corresponding to the same entity object in two projected images are obtained.

In some examples, the processing device acquires a projected image at the first position and the second position respectively, identifies an image feature respectively, and matches the image features in two projected images, so that the target regions where the matched image features are located are seen as target regions with common target feature, and the target regions with common target feature are determined to correspond to the same entity object. Therefore, the processing device takes the projected image acquired at the first position and the second position respectively as a first projected image and a second projected image, and determines the corresponding first position and second position.

In some other examples, based on change in direction when a mobile robot moves from a first position to a second position, the processing device maps image feature identified in the first projected image to a corresponding image region in the second projected image, and searches for matched image feature nearby the image region, thereby the target regions where the matched image feature is located are seen as target regions with common target feature, and target regions with common target feature are determined to correspond to the same entity object. In this way, the processing device determines the first projected image and the second projected image, and determines the corresponding first position and second position.

Wherein the image feature representing common target region includes at least one of the followings: a feature point, a feature line, a feature colour, and an image feature corresponding to key region in the common target region and marked in the image based on an object recognition model. Wherein, the feature point includes an angular point, an end point, an inflection point corresponding to the entity object, and so on. The feature line are for example a contour line identifying the entity object. The mobile robot compares the first projected image and the second projected image with preset feature information of multiple entity objects, and the region, which matches with the feature image of one entity object, in the first projected image and the second projected image is common target region. The object recognition model for example includes an object recognition algorithm model constructed based on a neural network, and a clustering algorithm model used for identifying objects.

When an object recognition model is used to identify common target region in each two projected images, rectangular box (or rounded rectangular box, circle, etc.) with the same color can be used in the two projected images to represent the identified common target region, the corresponding edge regions and center regions of two rectangular boxes are the key regions, and the image feature in the corresponding regions is extracted.

It should be noted that, entity objects obtained through any of the above examples are not necessarily identified by the processing device, that is, the processing device cannot determine the type of the entity object. For example, the processing device cannot always determine that the entity object corresponding to matched common target region in each of the first projected image and the second projected image is a table.

In some practical applications, the method for mapping further includes the step of identifying the target region corresponding to the same entity object in the first projected image and the second projected image respectively based on multiple preset entity object information. Wherein the preset entity object information means the type information of the identified entity object. For example, a dining table and a writing desk both belong to the type of tables. For another example, a computer chair and a bench both belong to the type of chairs. The entity object information includes "table", "chair" described by string or number, each entity object information indicates one type of entity objects, and different entity object information indicates different types of entity objects. It should be noted that types are only examples. In fact, according to the granularity of the type, entity objects classified into one type are marked as entity object information. Wherein, each entity object information is screened in advance based on environment in which a mobile robot moves and is stored in a storage device of a mobile robot. The entity object information is represented by feature information of entity objects which may be captured and placed in the environment or by image features of entity objects in the image.

In some examples, the entity object information is represented by image features of objects, and the image features can identify the target region where the entity object in the image is located. The processing device identifies the target region corresponding to the same entity object in each of the first projected image and the second projected image based on preset feature information corresponding to multiple entity object information. For example, the target region corresponding to the same entity object in the first projected image and the second projected image is traversed based on preset various types of image features, so that the type of the identified entity object is determined.

In some other examples, the entity object information is represented by an object type label. The processing device maps the target region corresponding to the same entity object in each of the first projected image and the second projected image with multiple preset entity object information through a preset image recognition algorithm. For example, programs stored in the storage device contain network structure and connection mode of a neural network model. In some embodiments, the neural network model can be a convolutional neural network, and the network structure includes an input layer, at least one hidden layer and at least one output layer. Wherein the input layer is configured to receive captured images or preprocessed images; the hidden layer includes a convolutional layer and an activation function layer, and the hidden layer even can include at least one of a normalization layer, a pooling layer, a fusion layer, and so on; and the output layer is configured to output an image marked with the object type label. The connection mode is determined according to a connection relationship of each layer in the neural network model, for example, a connection relationship between a front layer and a rear layer set based on data transmission, a connection relationship with data of the front layer set based on size of a convolution kernel in each hidden layer, and a full connection. The entity objects information is identified from the image by the neural network models.

Figure 2D:
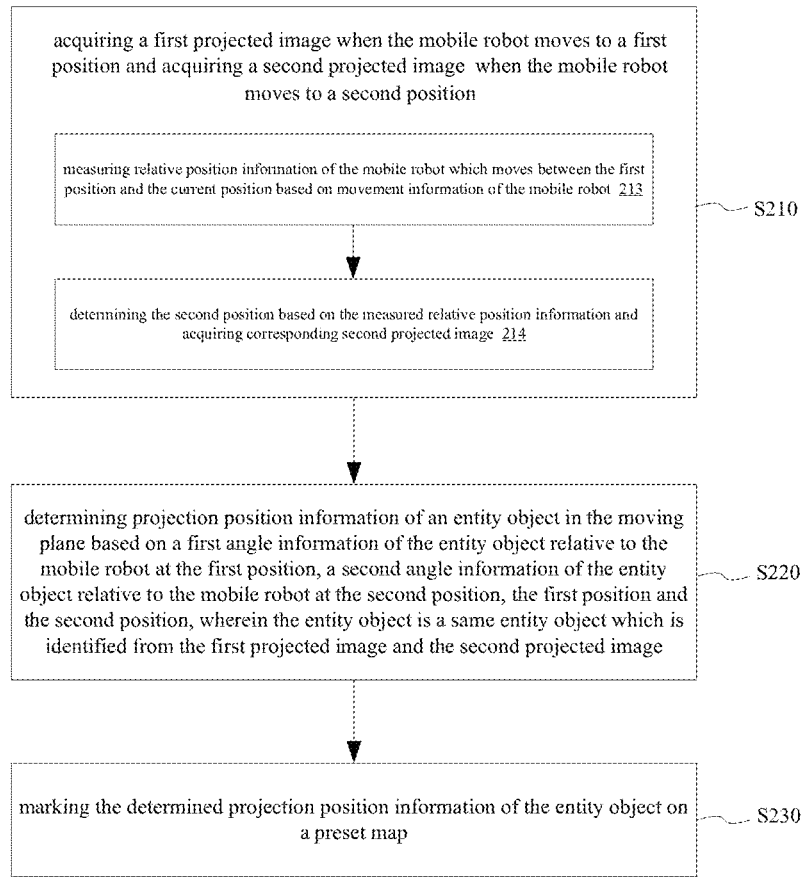
FIG. 2D shows a flow diagram of a method for mapping of the present application in another embodiment.

In addition, in order to determine the first position and the second position, the processing device further performs steps S213 and S214 when performing step S210. Please refer to FIG. 2D which shows a flow diagram of a method for mapping of the present application in another embodiment.

In step S213, according to movement information of the mobile robot, relative position information between the first position and current position of the mobile robot is measured.

In step S214, the second position is determined based on the measured relative position information and corresponding second projected image is acquired.

Herein, considering the influence by materials of a moving plane of a mobile robot and in order to improve measurement accuracy of the first position and the second position, during the movement of the mobile robot, the processing device monitors relative displacement and relative angle of the mobile robot when the mobile robot moves from the first position to the current position by the position measurement device of the mobile robot, and determines the second position and acquires the second projected image corresponding to the second position when the relative displacement and/or relative deflection angle exceed(s) a preset measurement threshold. Wherein the measurement threshold can be a fixed value or a relative value. For example, the measurement threshold is 5 cm. For another example, the measurement threshold is n times the number that the wheel of the mobile robot turns, wherein n is greater than 1.

In some embodiments, movement information of the mobile robot is acquired by a position measurement device of the mobile robot. The position measurement device includes but is not limited to a displacement sensor, a ranging sensor, an angle sensor, a binocular image acquisition device, a speed sensor, and so on, which is arranged on the mobile robot. Herein, the processing device can only monitor one of the position measurement devices to monitor the relative displacement and relative angle of the mobile robot when the mobile robot moves from the first position to the current position. For example, the position measurement device is a counting sensor arranged on a motor of the mobile robot, the number of turns for the motor is counted so as to acquire the relative displacement of the mobile robot when it moves from the first position to the second position, and an angle at which the motor operates is used for acquiring pose information, etc. For another example, the position measurement device measures moving speed of the mobile robot, and calculates the relative displacement from the first position to the second position based on the moving speed and moving time. Or, the relative displacement and relative angle of the mobile robot when the mobile robot moves from the first position to the current position are monitored based on position data provided by multiple sensors and image acquisition devices. For example, the relative displacement and relative angle of the mobile robot when it moves from the first position to the current position are determined according to a preset weighting, multiple groups of ranging data of the mobile robot relative to a fixed target acquired by a binocular image acquisition device, and data measured during operation of a motor.

In some other embodiments, the position measurement device is a GPS (Global Positioning System). Vector displacement and vector angle of the mobile robot when it moves from the first position to the current position are monitored through the GPS; and when the vector displacement and/or vector angle exceed(s) a preset measurement threshold, a second position is determined and a second projected image corresponding to the second position is acquired, and relative position information between the first position and the second position is acquired. In some other embodiments, the position measurement device is a device which performs localization based on measured wireless signals, for example, the position measurement device is a bluetooth (or WiFi) localization device; the position measurement device determines relative position of the first position and the second position relative to a preset wireless locating signal transmitting device according to measurements of received power of wireless locating signals at the first position and the second position; the position measurement device is used to monitor relative displacement and relative angle of the mobile robot when the mobile robot moves from the first position to the current position; and when the relative displacement and/or relative angle exceed(s) a preset measurement threshold, a second position is determined and a second projected image corresponding to the second position is acquired, and relative position information between the first position and the second position is acquired.

In some other embodiments, taking a grid map as an example, a mapping relationship between a unit grid length and actual displacement is determined in advance, and according to displacement information obtained during movement of the mobile robot, number of grids and angle of grids of the mobile robot when the mobile robot moves from the first position to the current position are monitored; and when the number of grids and/or angle of grids exceed(s) a preset measurement threshold, a second position is determined and a second projected image corresponding to the second position is acquired, and relative position information between the first position and the second position is acquired.

In step S220, a projection position information of an entity object in the moving plane is determined based on a first angle information of the entity object relative to the mobile robot at the first position, a second angle information of the entity object relative to the mobile robot at the second position, the first position and the second position, wherein the entity object is a same entity object which is identified from the first projected image and the second projected image.

It can be known with reference to FIG. 1 that, since the plane where the acquired projected image is located is in parallel with a moving plane of a mobile robot, in the coordinate system constructed based on the moving plane of a mobile robot (or based on the plane where a projected image is located), the angle between the target region of the same entity object in the projected image and the coordinate base line is equivalent to the angle of the projected position of the entity object on the moving plane relative to the coordinate base line, herein the coordinate base line is a straight line on a plane where the coordinate system is located. For example, the coordinate base line is consistent with an advancing direction of the mobile robot. In other words, when the processing device determines an angle between a target region corresponding to an entity object and the coordinate base line based on a projected image, it means that the entity object is determined to be located in a direction offset the angle relative to the moving direction of the mobile robot.

Therefore, during the movement of a mobile robot on a moving plane, different positions where the mobile robot located, and target regions in the captured projected images corresponding to a same entity object at different positions are mapped in the coordinate system. The projection position information of the entity object on the moving plane is determined by constructing a geometrical relationship, wherein the geometrical relationship is constructed based on each obtained angle and position, the geometrical relationship includes but is not limited to: a triangle relationship, a quadrangle relationship, etc.

It should be noted that, the coordinate system is used for understanding, but in actual map building period, the coordinate system is not necessarily drawn or displayed.

In some embodiments, step S220 includes that a geometrical relationship on the moving plane is constructed based on the first angle information, the second angle information, the first position and the second position; and projection position information of the entity object on the moving plane is determined according to the constructed geometrical relationship.

Figure 3:
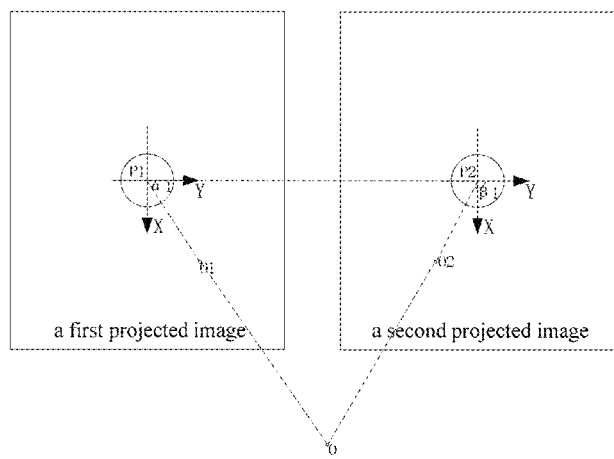
FIG. 3 shows a schematic diagram of principle of determining position information of an entity object corresponding to a common target region based on a first angle information, a second angle information, a first position and a second position.

Please refer to FIG. 3 which shows a schematic diagram of principle of determining position information of an entity object based on the first angle information, the second angle information, the first position and the second position. Taking the mobile robot moving from a first position P1 to a second position P2 in a straight line as an example, according to the above coordinate system, the processing device acquires the first projected image shown in FIG. 3 at the first position P1, the processing device acquires the second projected image shown in FIG. 3 at the second position P2, and the first position P1 and the second position P2 form a line P1P2. Meanwhile, the processing device further determines the target region O1 in the first projected image for the same entity object, and the target region O2 in the second projected image for the same entity object. For the same entity object, it should be located on the line P1O1 formed by the target region O1 and the first position P1, and also located on the line P2O2 formed by the target region O2 and the second position P2, in other words, the entity object is located at the position O where line P1O1 and line P2O2 are intersected, that is, the position O is the projected position of the entity object on the moving plane. Wherein the processing device determines the position of point O in a triangle constituted by points P1, P2 and O according to an angle α1 between the line P1O1 and the line P1P2, an angle β1 between the line P2O2 and the line P1P2, and the length of the line segment P1P2, so as to further obtain projection position information of the entity objects on the moving plane.

In the case that pose of a mobile robot is changed when it moves between a first position and a second position, the obtained first position and second position each contains the displacement information and pose information. Wherein according to pose information of the first position and the second position, relative pose change information is obtained. Wherein, the relative pose change information contains the rotated angle of the mobile robot between the second position and the first position on a moving plane. Correspondingly, step S220 includes: compensating an angular deviation of the second angle information based on the relative pose change information; and determining the projection position information of the entity object in the moving plane based on the first angle information, the compensated second angle information, the first position, and the second position.

Figure 4:
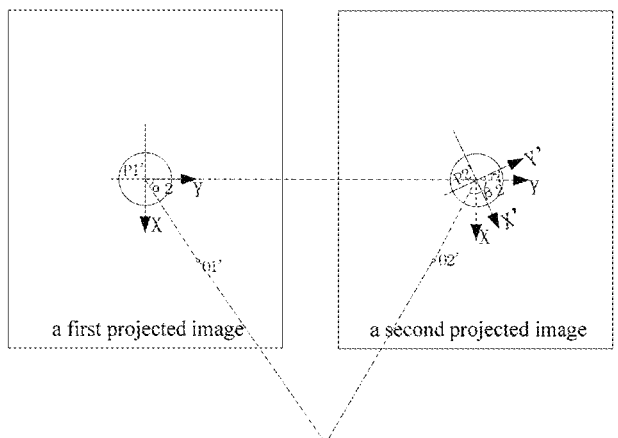
FIG. 4 shows a schematic diagram of principle of determining position information of an entity object corresponding to a common target region based on angle information and, a first position and a second position.

Taking a mobile robot moving from a first position to a second position as an example, please refer to FIG. 4 which shows a schematic diagram of principle of determining position information of an entity object corresponding to a common target region based on angle information, a first position and a second position. At a first position P1', the mobile robot moves towards the positive direction of Y axis, and at a second position P2', the mobile robot moves towards the positive direction of Y' axis which deviates to the left by an angle of γ related to the positive direction of Y axis, therefore, the processing device determines that the relative pose change information between the first position and the second position is an angle γ. Wherein the angle γ can be provided by an angle sensor in a position measurement device of the mobile robot.

Please still refer to FIG. 4, according to a position of a target region in a first projected image captured at the first position P1' in the coordinate system, the processing device determines that an entity object corresponding to the target region is located on the straight line P1'O1', and an angle between the straight line P1'O1' and the positive direction of the axis Y is α2. And according to a position of a target region in a second projected image captured at the second position P2' in the coordinate system, the processing device determines that the entity object corresponding to the target region is located on the straight line P2'O2', and an angle between the straight line P2'O2' and the positive direction of the axis Y' is β2. Due to an angle γ between the positive direction of axis Y' and the positive direction of axis Y, when the processing device determines a line between the entity object and the second position, an angular deviation caused by the angle γ should be compensated, in view of this, an angle β2' is a supplementary angle relative to an angle obtained through subtracting the angle β2 by the angle γ, namely, projection position information of the entity object is determined according to a triangle relationship constructed by the length of the line segment P1'P2', the angle α2 and the angle β2'.

It shall be noted that, in any of the above examples, a height of an entity object in a vertical direction of the moving plane is not considered. In practical applications, height information of an entity object can be measured by a height measurement device of a mobile robot when the entity object is localized, which shall be considered as an embodiment extended based on the map building solution provided by the present application and will not be described in detail herein.

It shall also be noted that, the above operation of compensation is only an example. The persons skilled in the art can obtain the projection position information of the entity object by compensating the angle information of the other position and continuing to perform the subsequent steps.

In step S230, the determined projection position information of the entity object is marked on a preset map. Herein, based on a proportional relationship between the map and a physical space combined with a first position, a second position and the obtained projection position information of the entity objects on a moving plane, the processing device obtains corresponding position information of these on the map, that is, projection position information of the entity object is marked on the map. Wherein in some embodiments, in order to characterize entity object at the marked position, the processing device marks image feature of the entity object at corresponding position on the map, so that when the mobile robot again captures the target region matched with the image feature, the position of the mobile robot on the map can be determined thereby.

In some other embodiments, based on the identified entity object information, the information is marked on the map. For example, text description, image identification or number corresponding to each entity object information can be marked on the map, and the text description can be name of the each entity object information, for example, name of object such as table, chair, flowerpot, television and refrigerator. For example, the text description corresponding to the table is described as "table", and the text description corresponding to the television is described as "television". The image identification can be icon of actual image corresponding to each entity object information. The number can be prearranged digital label corresponding to each entity object information. For example, "001" represents refrigerator, "002" represents chair, and "003" represents table, and so on.

In yet some other embodiments, projection position information of the marked entity objects is constantly corrected, or is marked on the map after correction. Therefore, during the movement of a mobile robot, for the identified same entity object, any examples mentioned in the above steps S210-S220 is performed for multiple times, to obtain at least two projection position information corresponding to the same entity object obtained through performing the above steps each time. Influenced by materials of the plane where the mobile robot moves, the first position information and the second position information obtained each time during movement of the mobile robot cannot be precisely determined. For example, when a mobile robot moves on a carpet, the real moving distance is shorter than a distance measured through a position measurement device. For another example, when a mobile robot moves on a floor, the real moving distance is approximate to a distance measured through a position measurement device. Therefore, when performing steps S210-S220 for multiple times, projection position information of the same entity object calculated each time based on a first position information, a second position information and angle information will differ. Hence, through the method for mapping provided by the present application, projection position information of a same entity object is determined by means of at least two triangles which are constituted by multiple positions of the mobile robot during the movement such as a first position, a second position, a third position, etc, and error correction is performed through the following step, that is, a step of performing error correction on the obtained at least two projection position information corresponding to the same entity object.

Herein, the manners of error correction include but are not limited to: 1) a weighted average method is used to perform error correction on each obtained projection position information, so that the corrected projection position information is marked on a preset map. For example, the weighted average is performed on horizontal and vertical coordinates in the obtained projection position information of the same entity object, so that the corrected projection position information is obtained and marked on the map. 2) a numerical optimization manner is used to perform iteration processing on each obtained projection position information, so that estimated projection position information after iteration processing is obtained, and the estimated projection position information is marked on a preset map. Taking a manner of marking position of entity object in real time as an example, according to a preset initial value of projection position information of identified entity object, as well as a gradient defined by projection position information corresponding to the entity object obtained at the first time and the initial value, projection position information corresponding to the entity object is determined for the second time, and the estimated projection position information is obtained through iterative loop with preset conditions, and the estimated projection position information as well as corresponding entity object information such as image feature or type are marked on the map; wherein the initial value can be set randomly, or obtained through the manners provided in the above steps S210-S220. Herein, the manner of obtaining projection position information based on the above steps S210-S220 for the Nth time includes determining the projection position information of the Nth time according to at least one position information and the corresponding angle information measured previously by a mobile robot, a newly measured position information and the corresponding angle information; or determining the projection position information of the Nth time based on the both two newly measured position information and the corresponding angle information; or determining the projection position information of the Nth time based on two position information and the corresponding angle information measured at any two different times; wherein N is greater than 1. Taking a manner of marking entity object position in non-real-time as an example, through steps S210-S220, multiple projection position information corresponding to the same entity object are collected, and each projection position information is put into a numerical optimization algorithm containing a gradient, so that projection position information with a minimum error is screened out or estimated, and the obtained projection position information with the minimum error and corresponding entity object information such as image feature or type are marked on the map.

In the method for mapping of the present application, the image acquisition device captures projected images which are projected by entity objects onto the moving plane of the mobile robot within a field of view of the mobile robot at the position, so that a first projected image of the mobile robot at a first position and a second projected image at a second position are obtained, and position information of the entity object corresponding to the common target region in the physical space where the mobile robot moves is determined based on angle information of the common target region on the moving plane, the first position and the second position, wherein the common target region is identified from the first projected image and the second projected image, thus accurate position information of the entity object is obtained. The determined position information of the entity object is marked on a preset map, thereby precision of the map is improved.

Figure 5A:
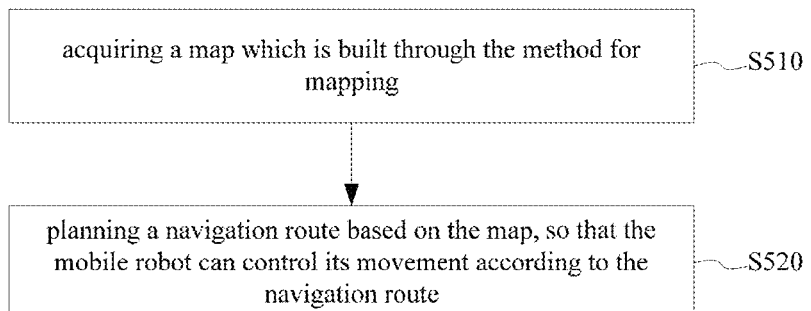
FIG. 5A shows a flow diagram of a navigation method of the present application in one embodiment.

Please refer to FIG. 5A which shows a flow diagram of a navigation method of the present application in one embodiment. The navigation method is applied to a mobile robot containing an image acquisition device. The image acquisition device captures entity objects within a field of view at the position where the mobile robot is located to obtain projected images, the projected images are on a plane which is parallel with a moving plane of the mobile robot. The navigation method is mainly performed by a mobile robot.

In step S510, a map which is built through the method for mapping is acquired. The method for mapping includes: acquiring a first projected image when the mobile robot moves to a first position and a second projected image when the mobile robot moves to a second position, determining position information of the entity object corresponding to the common target region in the physical space where the mobile robot moves based on angle information of the common target region on the moving plane, the first position and the second position, wherein the common target region is a same target region which is identified from the first projected image and the second projected image respectively; and marking the determined position information of the entity object on a preset map. For the method for mapping, please refer to FIG. 2A and related description of the method in FIG. 2A.

Herein, according to practical applications of a mobile robot, a navigation route for moving can be planned with the map. For example, for a security robot, during check of actual objects marked on the map, a navigation route is planned passing by each actual object. For another example, for a robot accompanying family members, when an electronic device is controlled remotely, a navigation route is planned with the marked actual object as a destination. For another example, for a cleaning robot, a navigation route corresponding to the cleaning mode is planned according to positions of actual objects in a preset cleaning region.

Figure 5B:
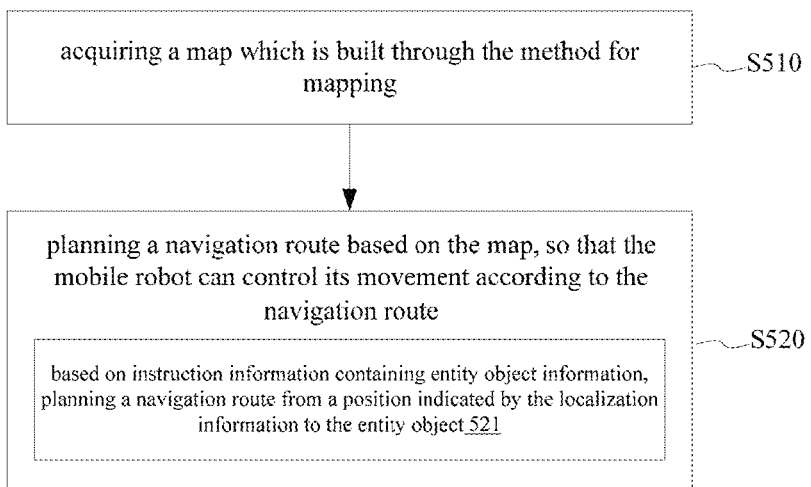
FIG. 5B shows a flow diagram of a navigation method of the present application in another embodiment.

In some embodiments, the map contains entity object information and position information of the entity object; step S520 further includes step S521. Please refer to FIG. 5B which shows a flow diagram of a navigation method of the present application in another embodiment.

In step S521, based on instruction information containing entity object information, a navigation route to the entity object is planned; in the present embodiment, the entity object information can be for example name description of each entity object information, for instance, name description of objects such as table, chair, flowerpot, television and refrigerator.

Wherein the manners of acquiring instruction information containing entity object information include but are not limited to: voice, text, etc. Herein, according to an operating purpose of a user on a mobile robot, the instruction can also contain executive instruction for a mobile robot, for example, the instruction can also include a cleaning instruction, an inspection instruction, a remote controlling instruction, and so on.

In one embodiment, step S521 can include: acquiring voice information, and identifying an instruction containing entity object information from the voice information. In one example, the mobile robot can directly receive voice information of a user and identify an instruction containing entity object information from the voice information. For example, the user can directly give a voice "table" to a mobile robot, and the mobile robot moves to the table after receiving the instruction and operates according to a preset operation. Taking a cleaning robot as an example, it is set in advance that after the cleaning robot receives an instruction containing entity object information of a user, the cleaning robot plans a navigation route according to the built map and moves to the position corresponding to the entity object information for cleaning. Under the condition, when a user gives a voice "table" to the cleaning robot, after receiving the voice instruction, the cleaning robot forms a navigation route based on the built map, moves to the table and performs cleaning operation. In addition, the voice information is not limited to short instruction only representing entity object information, but can also be long instruction containing entity object information, for example, when the user gives a voice "go to a table", the mobile robot can identify entity object information "table" instruction contained in the voice information, and then performs follow-up operations.

In another embodiment, step S521 further includes acquiring an instruction containing entity object information from a terminal device, wherein the terminal device is in wireless connection with the mobile robot. In one example, an instruction containing entity object information is input in the form of a text via a terminal device by users. For example, a user inputs "table" in the form of a text via a mobile phone APP. In another example, a user inputs instruction containing entity object information in the form of voice via a terminal device. For example, the user inputs "table" in the form of voice via a mobile phone APP. In addition, voice information input by a user is not limited to short instruction only representing entity object information, it can also be long instruction containing entity object information, for example, when a user gives a voice "go to the table", the terminal device translates the voice into a text and extracts key words such as table therein, and matches the translated text to a corresponding instruction and sends it to the mobile robot. Herein, the terminal device can be connected with the mobile robot in wireless connection manners such as wife connection, near field communication or bluetooth pairing, so that the instruction received by the terminal device can be transmitted to the mobile robot for follow-up operations. The terminal device can be for example a smart phone, a tablet computer, a wearable device or other intelligent devices with intelligent processing functions.

Figure 5C:
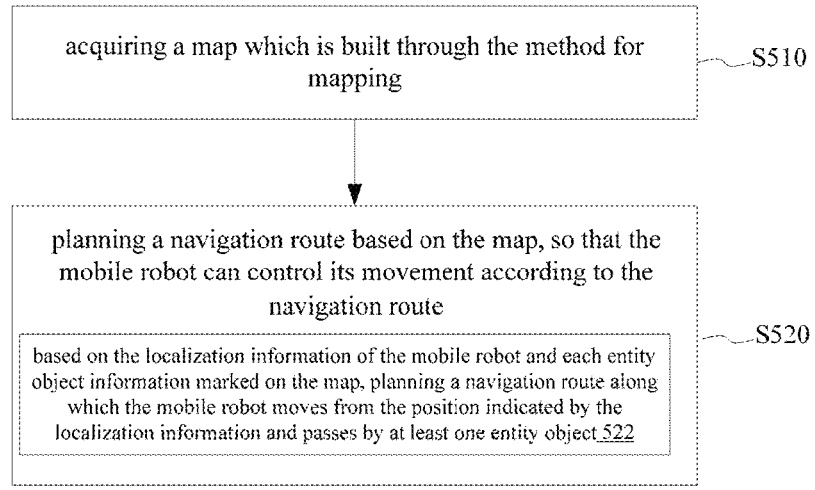
FIG. 5C shows a flow diagram of a navigation method of the present application in yet another embodiment.

In some other embodiments, step S520 further includes step S522. Please refer to FIG. 5C which shows a flow diagram of a navigation method of the present application in yet another embodiment. Step S522 includes planning a navigation route along which the mobile robot moves from the current position and passes by at least one entity object based on current position information of the mobile robot and each entity object information marked on the map. In some embodiments, a mobile robot generates a navigation route from the current position to the destination position according to current position of the mobile robot on the map, destination position at which entity object is located on the map, position information of other objects on the map or a preset route. For example, the navigation route can be a shortest route from the current position of the mobile robot to a destination position. For another example, the navigation route can be a route from the current position of the mobile robot to a destination position which is distinct from a previous travelling route of the robot. Taking the mobile robot being a cleaning robot as an example, according to a non-cleaned region and a cleaned region, a navigation route from the current position to a destination position is planned, wherein a same region is not cleaned twice, thereby cleaning efficiency is improved.

In some applications, the mobile robot is a cleaning robot; step S520 further includes planning a navigation route which traverse a cleaning region covering the corresponding entity objects according to the entity object information and the projection position information thereof marked on the map. In some examples, a cleaning robot plans a navigation route traversing a cleaning region based on a pre-determined cleaning region, wherein according to entity object information on the map corresponding to the cleaning region, the cleaning robot determines a navigation route which is convenient for cleaning based on the corresponding entity object information. Wherein, the cleaning region includes but is not limited to at least one of the following: a cleaning region divided in terms of a preset number of grids, and a cleaning region divided in terms of rooms. For example, within a cleaning region on the acquired map, entity object information and position information of a table is marked, therefore, a navigation route containing rotation around table legs is designed when planning a navigation route.

In the navigation method of the present application, an entity object which consistent with pre-marked entity object information is identified, and relative spatial position between the identified entity object and a mobile robot is determined based on images captured by an image acquisition device, so that the entity object information is marked on the map built with the method shown in FIG. 2A and a map marked with the entity object information is generated, thus during the subsequent movement and control, the mobile robot can identify destination position containing in user instruction based on entity object information marked on the map, and further moves to the position, thereby precision of the navigation route of the mobile robot, and human-computer interaction are improved.

Figure 6A:
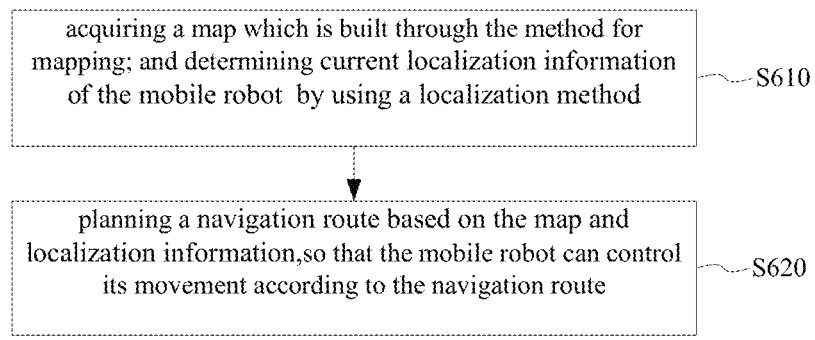
FIG. 6A shows a flow diagram of a navigation method of the present application in another embodiment.

Please refer to FIG. 6A which shows a flow diagram of a navigation method of the present application in one embodiment. The navigation method is applied to a mobile robot containing an image acquisition device. The image acquisition device captures entity objects within a field of view of the image acquisition device at a position where the mobile robot is located to obtain projected images, the projected images are on a plane which is parallel with a moving plane of the mobile robot. The navigation method is mainly performed by a mobile robot.

Please refer to FIG. 6 which shows a flow diagram of a navigation method of the present application in one embodiment. The navigation method is applied to a mobile robot containing an image acquisition device. The image acquisition device captures entity objects within a field of view of the image acquisition device at a position where the mobile robot is located to obtain projected images, the projected images are on a plane which is parallel with a moving plane of the mobile robot. The navigation method is mainly performed by a mobile robot.

In step S610, a map which is built through the method for mapping is acquired; and current localization information of the mobile robot is determined by using a localization method.

Wherein the method for map building includes: acquiring a first projected image when the mobile robot moves to a first position and a second projected image when the mobile robot moves to a second position, determining position information of the entity object corresponding to the common target region in the physical space where the mobile robot moves based on angle information of the common target region on the moving plane, the first position and the second position, wherein the common target region is a same target region which is identified from the first projected image and the second projected image respectively; and marking the determined position information of the entity object on a preset map. For the method for mapping, please refer to FIG. 2A and related description of the method in FIG. 2A.

Figure 7A:
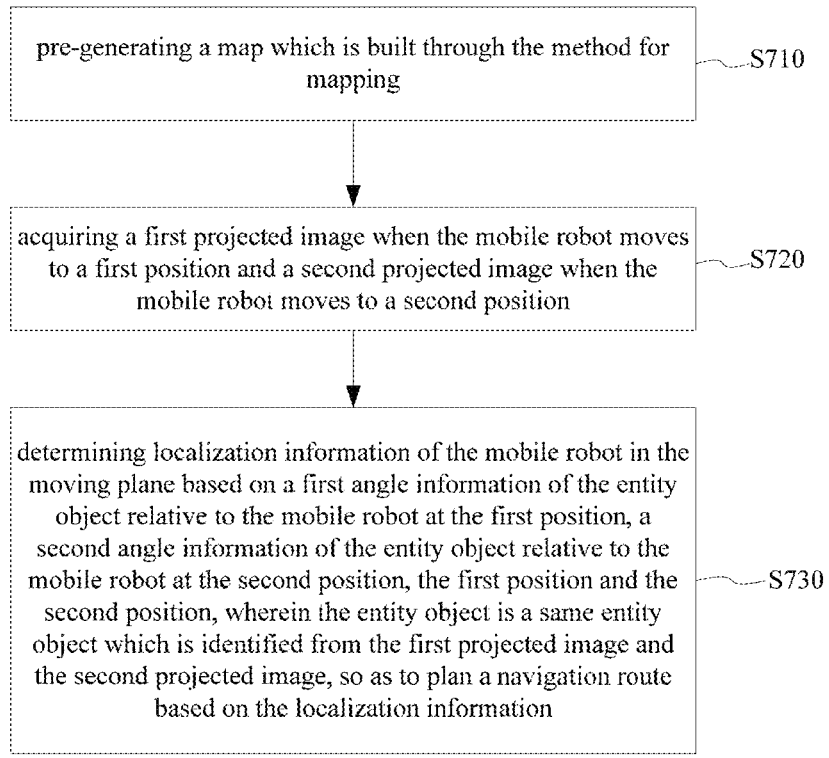
FIG. 7A shows a flow diagram of a localization method of the present application in one embodiment.

The present application further provides a localization method. In some applications, when a mobile robot is placed at an unknown position, the mobile robot is self-located (self-positioned) by using an image acquisition device in the mobile robot and relative position information obtained when moving for a certain distance. Please refer to FIG. 7A which shows a flow diagram of a localization method of the present application in one embodiment. Wherein the image acquisition device captures entity objects within a field of view at a position where the mobile robot is located to obtain projected images. The principal optic axis of the image acquisition device is vertical to a moving plane, and the localization method can be performed by a processing device contained in the mobile robot, wherein the processing device is an electronic device which can perform numeric calculation, logical calculation and data analysis, which includes but is not limited to: CPU, GPU, FPGA and volatile memories configured to temporarily store intermediate data generated during calculations. The localization method includes:

Step S710: pre-generating a map which is built through the method for mapping; wherein for the method for mapping, please refer to FIG. 2A and related description of the method shown in FIG. 2A.

Step S720: acquiring a first projected image when the mobile robot moves to a first position and a second projected image when the mobile robot moves to a second position; wherein the first projected image and the second projected image both contain a target region projected by the same entity object, which is marked on the map.

In some embodiments, the processing device acquires a first projected image at a first position and a second projected image at a second position, wherein the first position and the second position are within a range in which a distance between the first position and the second position is shorter than a diameter defined by a field of view of the image acquisition device.

For example, during the movement of the mobile robot, the image acquisition device captures images with a time interval preset by the processing device, and the processing device acquires static images captured at different time by the image acquisition device and the corresponding first position and the second position when static images are captured; wherein the time interval is at least shorter than the time period during which the mobile robot moves a diameter of one field of view. For another example, the image acquisition device can capture video. Since video is constituted by image frames, during the movement of the mobile robot, the processing device continuously or discontinuously collects image frames in the acquired video, and selects two of the image frames as two projected images, and acquires correspondingly the first position and the second position, wherein the selected two-frame images have fields of view which are partially overlapped with each other.

For another example, the mobile robot instructs the image acquisition device to capture projected images of entity objects within a field of view of the image acquisition device with a preset time period, then the processing device acquires projected images captured by the image acquisition device at different time, and selects two of the projected images as a first projected image and a second projected image. The position at which the image acquisition device captures the first projected image is the first position, while the position at which the image acquisition device captures the second projected image is the second position. Wherein the time period is represented by a time unit, or the time period is represented by number of image frame interval.

For another example, the mobile robot is in communication with an intelligent terminal, and the intelligent terminal can modify the time period through a specific APP. For example, after running the APP, a modified interface of the time period is displayed on the touch screen of the intelligent terminal, and the time period is modified through a touch operation on the modified interface; for another example, a time period modification instruction is directly sent to the mobile robot to modify the time period. The time period modification instruction can be for example a voice containing a modification instruction, and the voice can be for example "the period is modified to be three seconds". For yet another example, the voice can be "the number of image frame interval is modified to be five".

In yet some other embodiments, the processing device determines to select a first projected image at a first position and a second projected image and a second position on the basis that the two projected images have a common target region. Herein, while performing step S720, or without any necessary sequence, the processing device further performs at least one of the following steps S721 and S722.

Figure 7B:
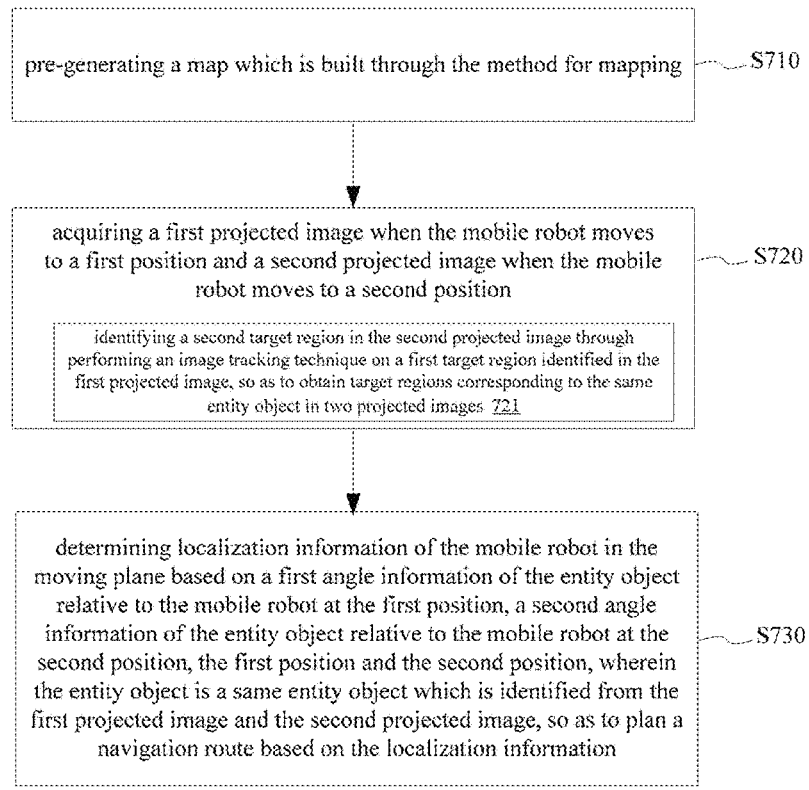
FIG. 7B shows a flow diagram of a localization method of the present application in another embodiment.

Please refer to FIG. 7B which shows a flow diagram of a localization method of the present application in another embodiment, in step S721, based on a first target region identified in a first projected image and by using an image tracking technique, a corresponding second target region is identified in a second projected image, so that target regions corresponding to the same entity object in two projected images are obtained, hence the second projected image and the corresponding second position are acquired.

Herein, the processing device obtains an image feature in the first projected image through an image processing algorithm, determines the first target region based on the image feature, tracks at least one projected image captured by the image acquisition device through an image tracking technique after the first projected image is captured, and when the image feature is still found in the second projected image captured at the second position by continuous tracking, the first projected image at the first position and the second projected image at the second position are respectively acquired, and the tracked image feature is determined to be the same entity object. Wherein the image feature includes preset graphic feature corresponding to entity object type, or image feature obtained through an image processing algorithm. Wherein the image processing algorithm includes but is not limited to at least one of the followings: grayscale processing, sharpening processing, contour extraction, corner extraction, line extraction, and image processing algorithm through machine learning. Image processing algorithm through machine learning includes but is not limited to: neural network algorithm and clustering algorithm.

Figure 7C:
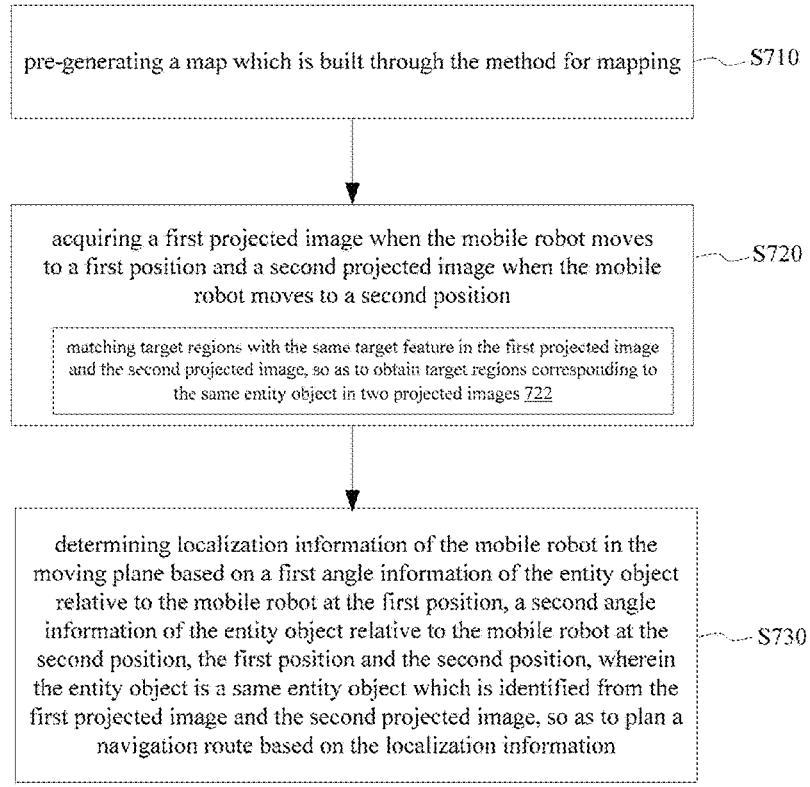
FIG. 7C shows a flow diagram of a localization method of the present application in yet another embodiment.

Please refer to FIG. 7C which shows a flow diagram of a localization method of the present application in yet another embodiment, in step S722, target regions with the same target feature in the first projected image and the second projected image are matched, so that target regions corresponding to the same entity object in two projected images are obtained.

In some examples, the processing device acquires a projected image at the first position and the second position respectively, identifies an image feature respectively, and matches the image features in two projected images, so that the target regions where the matched image features are located are seen as target regions with common target feature, and the target regions with common target feature are determined to correspond to the same entity object. Therefore, the processing device takes the projected image acquired at the first position and the second position respectively as a first projected image and a second projected image, and determines the corresponding first position and second position.

In some other examples, based on change in direction when a mobile robot moves from a first position to a second position, the processing device maps image feature identified in the first projected image to a corresponding image region in the second projected image, and searches for matched image feature nearby the image region, thereby the target regions where the matched image feature is located are seen as target regions with common target feature, and target regions with common target feature are determined to correspond to the same entity object. In this way, the processing device determines the first projected image and the second projected image, and determines the corresponding first position and second position.

Wherein the image feature representing common target region includes at least one of the followings: a feature point, a feature line, a feature color, and an image feature corresponding to key region in the common target region and marked in the image based on an object recognition model. Wherein, the feature point includes an angular point, an end point, an inflection point corresponding to the entity object, and so on. The feature line is for example a contour line identifying the entity object. The mobile robot compares the first projected image and the second projected image with preset feature information of multiple entity objects, and the region, which matches with the feature image of one entity object, in the first projected image and the second projected image is common target region. The object recognition model for example includes an object recognition algorithm model constructed based on a neural network, and a clustering algorithm model used for identifying objects. When an object recognition model is used to identify common target region in each two projected images, rectangular box (or rounded rectangular box, circle, etc.) with the same color can be used in the two projected images to represent the identified common target region, the corresponding edge regions and center regions of two rectangular boxes are the key regions, and the image feature in the corresponding regions is extracted.

It should be noted that, entity objects obtained through any of the above examples are not necessarily identified by the processing device, that is, the processing device cannot determine the type of the entity object. For example, the processing device cannot always determine that the entity object corresponding to matched common target region in each of the first projected image and the second projected image is a table.

In some practical applications, the method for localizing further includes the step of identifying the target region corresponding to the same entity object in the first projected image and the second projected image respectively based on multiple preset entity object information. Wherein the preset entity object information means the type information of the identified entity object. For example, a dining table and a writing desk both belong to the type of tables. For another example, a computer chair and a bench both belong to the type of chairs. The entity object information includes "table", "chair" described by string or number, each entity object information indicates one type of entity objects, and different entity object information indicates different types of entity objects. It should be noted that types are only examples. In fact, according to the granularity of the type, entity objects classified into one type are marked as entity object information. Wherein, each entity object information is screened in advance based on environment in which a mobile robot moves and is stored in a storage device of a mobile robot. The entity object information is represented by feature information of entity objects which may be captured and placed in the environment or by image features of entity objects in the image.

In some examples, the entity object information is represented by image features of objects, and the image features can identify the target region where the entity object in the image is located. The processing device identifies the target region corresponding to the same entity object in each of the first projected image and the second projected image based on preset feature information corresponding to multiple entity object information. For example, the target region corresponding to the same entity object in the first projected image and the second projected image is traversed based on preset various types of image features, so that the type of the identified entity object is determined.

In some other examples, the entity object information is represented by an object type label. The processing device maps the target region corresponding to the same entity object in each of the first projected image and the second projected image with multiple preset entity object information through a preset image recognition algorithm. For example, programs stored in the storage device contain network structure and connection mode of a neural network model. In some embodiments, the neural network model can be a convolutional neural network, and the network structure includes an input layer, at least one hidden layer and at least one output layer. Wherein the input layer is configured to receive captured images or preprocessed images; the hidden layer includes a convolutional layer and an activation function layer, and the hidden layer even can include at least one of a normalization layer, a pooling layer, a fusion layer, and so on; and the output layer is configured to output an image marked with the object type label. The connection mode is determined according to a connection relationship of each layer in the neural network model, for example, a connection relationship between a front layer and a rear layer set based on data transmission, a connection relationship with data of the front layer set based on size of a convolution kernel in each hidden layer, and a full connection. The entity objects information is identified from the image by the neural network models.

Figure 7D:
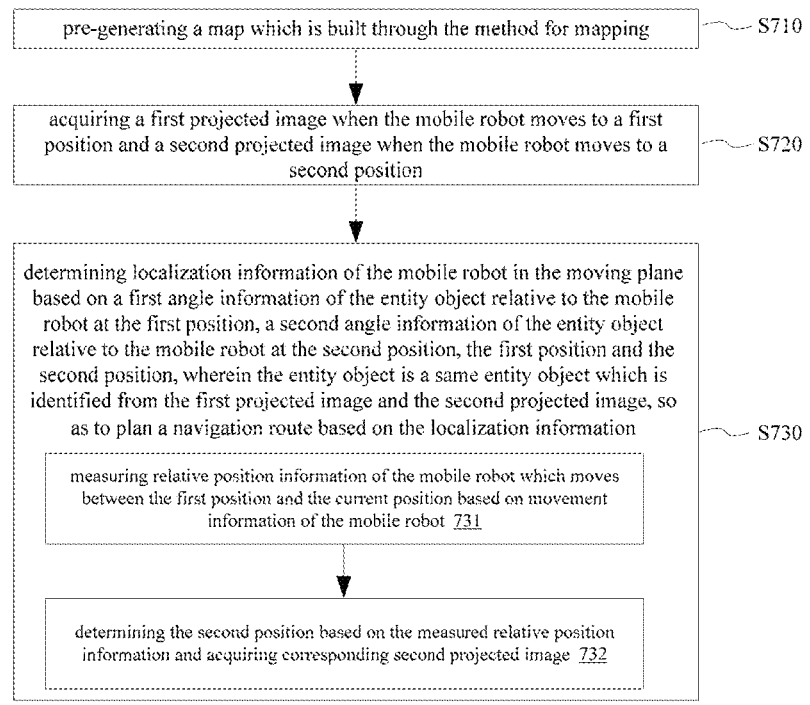
FIG. 7D shows a flow diagram of a localization method of the present application in still another embodiment.

In addition, in order to determine the first position and the second position, the processing device further performs steps S731 and S732 when performing step S730. Please refer to FIG. 7D which shows a flow diagram of a localization method of the present application in still another embodiment.

In step S731, according to movement information of the mobile robot, relative position information between the first position and current position of the mobile robot is measured.

In step S732, the second position is determined based on the measured relative position information and corresponding second projected image is acquired.

Herein, considering the influence by materials of a moving plane of a mobile robot and in order to improve measurement accuracy of the first position and the second position, during the movement of the mobile robot, the processing device monitors relative displacement and relative angle of the mobile robot when the mobile robot moves from the first position to the current position by the position measurement device of the mobile robot, and determines the second position and acquires the second projected image corresponding to the second position when the relative displacement and/or relative deflection angle exceed(s) a preset measurement threshold. Wherein the measurement threshold can be a fixed value or a relative value. For example, the measurement threshold is 5 cm. For another example, the measurement threshold is n times the number that the wheel of the mobile robot turns, wherein n is greater than 1.

In some embodiments, movement information of the mobile robot is acquired by a position measurement device of the mobile robot. The position measurement device includes but is not limited to a displacement sensor, a ranging sensor, an angle sensor, a binocular image acquisition device, a speed sensor, and so on, which is arranged on the mobile robot. Herein, the processing device can only monitor one of the position measurement devices to monitor the relative displacement and relative angle of the mobile robot when the mobile robot moves from the first position to the current position. For example, the position measurement device is a counting sensor arranged on a motor of the mobile robot, the number of turns for the motor is counted so as to acquire the relative displacement of the mobile robot when it moves from the first position to the second position, and an angle at which the motor operates is used for acquiring pose information, etc. For another example, the position measurement device measures moving speed of the mobile robot, and calculates the relative displacement from the first position to the second position based on the moving speed and moving time. Or, the relative displacement and relative angle of the mobile robot when the mobile robot moves from the first position to the current position are monitored based on position data provided by multiple sensors and image acquisition devices. For example, the relative displacement and relative angle of the mobile robot when it moves from the first position to the current position are determined according to a preset weighting, multiple groups of ranging data of the mobile robot relative to a fixed target acquired by a binocular image acquisition device, and data measured during operation of a motor.

In some other embodiments, the position measurement device is a GPS (Global Positioning System). Vector displacement and vector angle of the mobile robot when it moves from the first position to the current position are monitored through the GPS; and when the vector displacement and/or vector angle exceed(s) a preset measurement threshold, a second position is determined and a second projected image corresponding to the second position is acquired, and relative position information between the first position and the second position is acquired. In some other embodiments, the position measurement device is a device which performs localization based on measured wireless signals, for example, the position measurement device is a bluetooth (or WiFi) localization device; the position measurement device determines relative position of the first position and the second position relative to a preset wireless locating signal transmitting device according to measurements of received power of wireless locating signals at the first position and the second position; the position measurement device is used to monitor relative displacement and relative angle of the mobile robot when the mobile robot moves from the first position to the current position; and when the relative displacement and/or relative angle exceed(s) a preset measurement threshold, a second position is determined and a second projected image corresponding to the second position is acquired, and relative position information between the first position and the second position is acquired.

In some other embodiments, taking a grid map as an example, a mapping relationship between a unit grid length and actual displacement is determined in advance, and according to displacement information obtained during movement of the mobile robot, number of grids and angle of grids of the mobile robot when the mobile robot moves from the first position to the current position are monitored; and when the number of grids and/or angle of grids exceed(s) a preset measurement threshold, a second position is determined and a second projected image corresponding to the second position is acquired, and relative position information between the first position and the second position is acquired.

After determining relative position information between the first position and the second position, and a first angle information of the identified entity object relative to the mobile robot at the first position and a second angle information of the identified entity object relative to the mobile robot at the second position, step S730 is performed.

Step S730 includes that determining localization information of the mobile robot in the moving plane based on a first angle information of the entity object relative to the mobile robot at the first position, a second angle information of the entity object relative to the mobile robot at the second position, the first position and the second position, wherein the entity object is a same entity object which is identified from the first projected image and the second projected image, so as to plan a navigation route based on the localization information.

Herein, according to an image feature or type of entity object pre-marked on the map, a mobile robot can map the identified image feature or type of entity object with corresponding information marked on the map. Wherein, there is one or more mapping relationships in order to improve accuracy of localization. For example, when the identified image feature or type of entity object is unique on the map, the mapping relationship can be only one, and the position of identified entity object in a physical space is obtained through the corresponding position thereof on the map. For another example, when the identified image feature or type of entity object is not unique on the map, multiple features or types is identified in at least two projected images, and a mapping relationship conforming to multiple features or types is obtained from the map based on relative position relationship among multiple image features or types as well as relative position relationship of mobile robot caused by movement, so that physical position of each marked feature or type on a moving plane of a mobile robot is obtained from the map.

With reference to the description of FIG. 1, it can be known that, a position of an entity object in a projected image captured by the image acquisition device is used to indicate a position where the entity object is projected onto the moving plane of the mobile robot, and an angle of the position of the entity object in a projected image relative to a travelling direction of the mobile robot is used to indicate an angle of the position where the entity object is projected onto the moving plane of the mobile robot relative to the travelling direction of the mobile robot.

It can be known again with reference to FIG. 1 that, since the plane where the acquired projected image is located is in parallel with a moving plane of a mobile robot, in the coordinate system constructed based on the moving plane of a mobile robot (or based on the plane where a projected image is located), the angle between the target region of the same entity object in the projected image and the coordinate base line is equivalent to the angle of the projected position of the entity object on the moving plane relative to the coordinate base line, herein the coordinate base line is a straight line on a plane where the coordinate system is located. For example, the coordinate base line is consistent with an advancing direction of the mobile robot. In other words, when the processing device determines an angle between a target region corresponding to an entity object and the coordinate base line based on a projected image, it means that the entity object is determined to be located in a direction offset the angle relative to the moving direction of the mobile robot.

Therefore, during the movement of a mobile robot on a moving plane, different positions where the mobile robot located, and target regions in the captured projected images corresponding to a same entity object at different positions are mapped in the coordinate system. The localization information of the mobile robot on the moving plane is determined by constructing a geometrical relationship, wherein the geometrical relationship is constructed based on each obtained angle and position, the geometrical relationship includes but is not limited to: a triangle relationship, a quadrangle relationship, etc.

It should be noted that, the coordinate system is used for understanding, but in actual map building period, the coordinate system is not necessarily drawn or displayed.

In some embodiments, step S730 also includes that a geometrical relationship on the moving plane is constructed based on the first angle information, the second angle information, the first position and the second position; and localization information of the mobile robot on the moving plane is determined according to the constructed geometrical relationship.

Taking the mobile robot moving from a first position P1 to a second position P2 in a straight line as an example, please refer to FIG. 3 which shows a schematic diagram of principle of determining position information of an entity object based on the first angle information, the second angle information, the first position and the second position. according to the above coordinate system, the processing device acquires the first projected image shown in FIG. 3 at the first position P1, the processing device acquires the second projected image shown in FIG. 3 at the second position P2, and the processing device can obtain a line P1P2 formed by the first position P1 and the second position P2 through the above mentioned measuring method. Meanwhile, the processing device further determines the target region O1 in the first projected image for the same entity object, and the target region O2 in the second projected image for the same entity object. For the same entity object, it should be located on the line P1O1 formed by the target region O1 and the first position P1, and also located on the line P2O2 formed by the target region O2 and the second position P2, in other words, the entity object is located at the position O where line P1O1 and line P2O2 are intersected, that is, the position O is the projected position of the entity object on the moving plane. Wherein the processing device determines the physical location of points P1 and P2, which is in a triangle constituted by points P1, P2 and O, on the moving plane according to an angle α1 between the line P1O1 and the line P1P2, an angle β1 between the line P2O2 and the line P1P2, the length of the line segment P1P2 and the position of point O on the moving plane based on the map.

In the case that pose of a mobile robot is changed when it moves between a first position and a second position, the obtained first position and second position each contains the displacement information and pose information. Wherein according to pose information of the first position and the second position, relative pose change information is obtained. Wherein, the relative pose change information contains the rotated angle of the mobile robot between the second position and the first position on a moving plane. Correspondingly, step S730 includes: compensating an angular deviation of the second angle information based on the relative pose change information; and determining the localization information of the mobile robot on the moving plane based on the first angle information, the compensated second angle information, the first position, and the second position.

Taking a mobile robot moving from a first position to a second position as an example. Please refer to FIG. 4 which shows a schematic diagram of principle of determining position information of an entity object corresponding to a common target region based on angle information, a first position and a second position. At a first position P1', the mobile robot moves towards the positive direction of Y axis, and at a second position P2', the mobile robot moves towards the positive direction of Y' axis which deviates to the left by an angle of γ related to the positive direction of Y axis, therefore, the processing device determines that the relative pose change information between the first position and the second position is an angle γ. Wherein the angle γ can be provided by an angle sensor in a position measurement device of the mobile robot.

Please still refer to FIG. 4, according to a position of a target region in a first projected image captured at the first position P1' in the coordinate system, the processing device determines that an entity object corresponding to the target region is located on the straight line P1'O1', and an angle between the straight line P1'O1' and the positive direction of the axis Y is α2. And according to a position of a target region in a second projected image captured at the second position P2' in the coordinate system, the processing device determines that the entity object corresponding to the target region is located on the straight line P2'O2', and an angle between the straight line P2'O2' and the positive direction of the axis Y' is β2. Due to an angle γ between the positive direction of axis Y' and the positive direction of axis Y, when the processing device determines a line between the entity object and the second position, an angular deviation caused by the angle γ should be compensated, in view of this, an angle β2' is a supplementary angle relative to an angle obtained through subtracting the angle β2 by the angle γ, namely, localization information of the mobile robot when it captures a first projected image and a second projected image is determined according to a triangle relationship constructed by the length of the line segment P1'P2', the angle α2 and the angle β2'.

It shall be noted that, in any of the above examples, a height of an entity object in a vertical direction of the moving plane is not considered. In practical applications, height information of an entity object can be measured by a height measurement device of a mobile robot when the entity object is localized, which shall be considered as an embodiment extended based on the map building solution provided by the present application and will not be described in detail herein.

It shall also be noted that, the above operation of compensation is only an example. The persons skilled in the art can obtain the projection position information of the entity object by compensating the angle information of the other position and continuing to perform the subsequent steps.

In still some other embodiments, the determined localization information of a mobile robot is constantly corrected, or is determined after localization correction more than once. Therefore, the localization method further includes the following step: instructing the mobile robot to capture corresponding second projected images respectively at multiple second positions for the same identified entity object, the first position and the captured first projected image, and the steps of determining the localization information of the mobile robot at the first position are performed respectively based on the first projected image at the first position and each second projected image captured respectively at multiple second positions, so as to obtain at least two localization information corresponding to the first position of the mobile robot which is obtained through performing the above steps each time. Herein, in combination with the above steps S710-S720, it can be known that, in the present step, localization information of the mobile robot at the first position at each time can be respectively determined based on relative position information between the first position and each second position, the first angle information of the entity object identified from the first projected image relative to the first position, the second angle information of the entity object identified from each second projected image relative to the second position, and position information of the entity object marked on the map. Influenced by materials of the plane where the mobile robot moves, relative position information between the first position and the second position acquired each time during movement of the mobile robot cannot be precisely determined. For example, when the mobile robot moves on a carpet, the real moving distance is shorter than the distance measured through a position measurement device. For another example, when a mobile robot moves on a floor, the real moving distance is approximate to the distance measured through a position measurement device. Therefore, when performing steps S710-S720 for multiple times, localization information at the first position calculated by means of relative position information, the first angle information, the second angle information and position information of the entity object marked on the map will differ.

Therefore, through the method for mapping provided by the present application, localization information at the first position is determined by means of at least two triangles which are constituted by a first position, multiple second positions and position information of the entity object marked on the map during the movement of the mobile robot, and error correction is performed through the following step, that is, performing error correction on the obtained at least two localization information corresponding to the first position of the mobile robot, such that a localization position after error correction is determined to be a localization position of the mobile robot at a first position.

Herein, the manners of error correction include but are not limited to: 1) a weighted average method is used to perform error correction on each obtained localization information, so as to take the corrected localization information as localization information of the mobile robot at a first position. For example, the weighted average is performed on horizontal and vertical coordinates in the obtained projection position information of the same entity object, so that the corrected localization information is taken as localization information of the mobile robot at the first position. 2) a numerical optimization manner is used to perform iteration processing on each obtained localization information at the first position, so that estimated localization position at the first position after iteration processing is obtained, and the estimated localization information is taken as the localization information of the mobile robot at the first position. For example, according to a preset initial value of localization information corresponding to the first position, as well as a gradient defined by the localization information corresponding to the first position obtained at the first time and the initial value, movement direction of the mobile robot is controlled and locating operation on the first position is performed for a second time, and the estimated localization information corresponding to the first position is obtained through preset iterative loop, and the estimated localization information corresponding to the first position is taken as localization information at the first position; wherein the initial value can be set randomly, or can be obtained through the manners provided in the above steps S710-S720.

After obtaining the corrected localization information at the first position, in combination with relative position information of the mobile robot from the first position to the current position, current localization information of the mobile robot is determined.

For example, current localization information of the mobile robot is determined based on relative position information between a first position and a second position obtained by a position measurement device of the robot, and localization information at the first position. For another example, based on localization position corresponding to the first position after error correction and each localization information corresponding to the first position without error correction, a measurement error of the position measurement device of the mobile robot is determined, thus an error of relative position information measured when the mobile robot moves from the first position to the current position is compensated according to the measurement error, and localization information of the mobile robot at the current position is determined.

In the localization method of the present application, through the technical of acquiring, by the image acquisition device, a first projected image when a mobile robot is at a first position, a second projected image when the mobile robot is at a second position; and determining localization information of the mobile robot on the moving plane based on angle information of common target regions on the moving plane, the first position and the second position, wherein the common target regions are identified from the first projected image and the second projected image, thus localization information of the mobile robot can be obtained precisely.

After the current position of a mobile robot is determined, the present application further provides a navigation method, including step S610 and step S620.

In step S610, a map which is built through any one of methods for mapping is acquired, and localization information of the mobile robot obtained by using the above steps S710 to S730 is acquired.

In step S620, a navigation route is planned based on the above built map and the obtained localization information, so that the mobile robot moves along the navigation route. Herein, the navigation method is mainly performed by a processing device of a mobile robot, and the processing device provides the planned navigation route to a lower computer, so that the lower computer controls a motor to drive a movement devices to move. Wherein the lower computer can be for example an MCU, a CPU, etc.

Herein, according to practical applications of a mobile robot, a navigation route for moving can be planned with the map. For example, for a security robot, during check of actual objects marked on the map, a navigation route is planned passing by each actual object. For another example, for a robot accompanying family members, when an electronic device is controlled remotely, a navigation route is planned with the marked actual object as a destination. For another example, for a cleaning robot, a navigation route corresponding to the cleaning mode is planned according to positions of actual objects in a preset cleaning region.

In some embodiments, the map contains entity object information and position information of the entity object; step S620 further includes step S621.

Figure 6B:
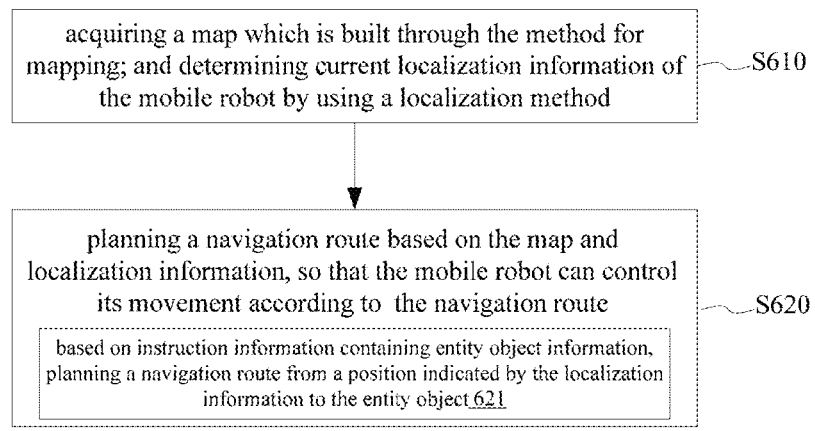
FIG. 6B shows a flow diagram of a navigation method of the present application in yet another embodiment.
Figure 6C:
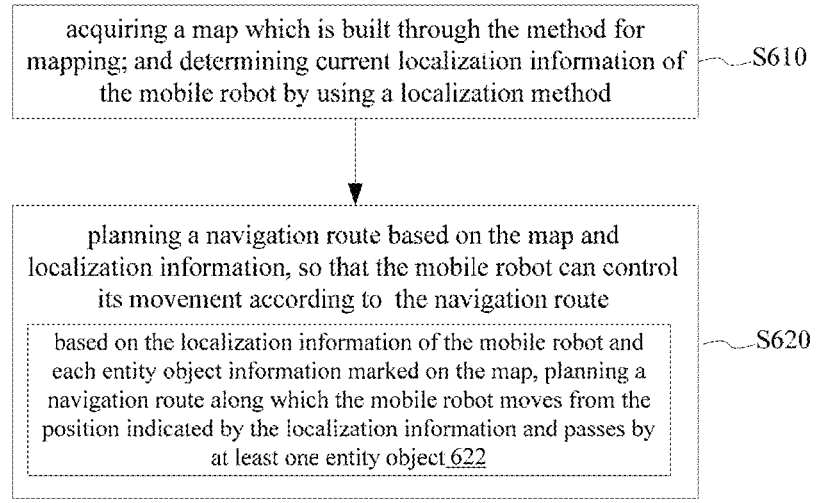
FIG. 6C shows a flow diagram of a navigation method of the present application in still another embodiment.

Please refer to FIG. 6B which shows a flow diagram of a navigation method of the present application in yet another embodiment, in step S621, based on instruction information containing entity object information, a navigation route to the entity object is planned; in the present embodiment, the entity object information can be for example name description of each entity object information, for instance, name description of objects such as table, chair, flowerpot, television and refrigerator.

Wherein the manners of acquiring instruction information containing entity object information include but are not limited to: voice, text, etc. Herein, according to an operating purpose of a user on a mobile robot, the instruction can also contain executive instruction for a mobile robot, for example, the instruction can also include a cleaning instruction, an inspection instruction, a remote controlling instruction, and so on.

In one embodiment, step S621 can include: acquiring voice information, and identifying an instruction containing entity object information from the voice information. In one example, the mobile robot can directly receive voice information of a user and identify an instruction containing entity object information from the voice information. For example, the user can directly give a voice "table" to a mobile robot, and the mobile robot moves to the table after receiving the instruction and operates according to a preset operation. Taking a cleaning robot as an example, it is set in advance that after the cleaning robot receives an instruction containing entity object information of a user, the cleaning robot plans a navigation route according to the built map and moves to the position corresponding to the entity object information for cleaning. Under the condition, when a user gives a voice "table" to the cleaning robot, after receiving the voice instruction, the cleaning robot forms a navigation route based on the built map, moves to the table and performs cleaning operation. In addition, the voice information is not limited to short instruction only representing entity object information, but can also be long instruction containing entity object information, for example, when the user gives a voice "go to a table", the mobile robot can identify entity object information "table" instruction contained in the voice information, and then performs follow-up operations.

In another embodiment, step S621 further includes acquiring an instruction containing entity object information from a terminal device, wherein the terminal device is in wireless connection with the mobile robot. In one example, an instruction containing entity object information is input in the form of a text via a terminal device by users. For example, a user inputs "table" in the form of a text via a mobile phone APP. In another example, a user inputs instruction containing entity object information in the form of voice via a terminal device. For example, the user inputs "table" in the form of voice via a mobile phone APP. In addition, voice information input by a user is not limited to short instruction only representing entity object information, it can also be long instruction containing entity object information, for example, when a user gives a voice "go to the table", the terminal device translates the voice into a text and extracts key words such as table therein, and matches the translated text to a corresponding instruction and sends it to the mobile robot. Herein, the terminal device can be connected with the mobile robot in wireless connection manners such as wife connection, near field communication or bluetooth pairing, so that the instruction received by the terminal device can be transmitted to the mobile robot for follow-up operations. The terminal device can be for example a smart phone, a tablet computer, a wearable device or other intelligent devices with intelligent processing functions.

In some other embodiments, step S620 further includes step S622. Please refer to FIG. 6C which shows a flow diagram of a navigation method of the present application in still another embodiment. Step S622 includes planning a navigation route along which the mobile robot moves from the localization position and passes by at least one entity object based on localization information of the mobile robot and each entity object information marked on the map. In some embodiments, a mobile robot generates a navigation route from the current position to the destination position according to current position of the mobile robot on the map, destination position at which entity object is located on the map, position information of other objects on the map or a preset route. For example, the navigation route can be a shortest route from the current position of the mobile robot to a destination position. For another example, the navigation route can be a route from the current position of the mobile robot to a destination position which is distinct from a previous travelling route of the robot. Taking the mobile robot being a cleaning robot as an example, according to a non-cleaned region and a cleaned region, a navigation route from the current position to a destination position is planned, wherein a same region is not cleaned twice, thereby cleaning efficiency is improved.

In some applications, the mobile robot is a cleaning robot; step S620 further includes planning a navigation route which traverse a cleaning region covering the corresponding entity objects according to the entity object information and the projection position information thereof marked on the map. In some examples, a cleaning robot plans a navigation route traversing a cleaning region based on a pre-determined cleaning region, wherein according to entity object information on the map corresponding to the cleaning region, the cleaning robot determines a navigation route which is convenient for cleaning based on the corresponding entity object information. Wherein, the cleaning region includes but is not limited to at least one of the following: a cleaning region divided in terms of a preset number of grids, and a cleaning region divided in terms of rooms. For example, within a cleaning region on the acquired map, entity object information and position information of a table is marked, therefore, a navigation route containing rotation around table legs is designed when planning a navigation route.

In the navigation method of the present application, relative spatial position between identified entity object and a mobile robot is determined by identifying entity object which conforms to pre-marked entity object information and based on image captured by an image acquisition device, and entity object information is marked on a map built by the method shown in FIG. 2A, so as to generate a map marked with entity object information. And precise localization information about the mobile robot is obtained based on the localization method shown in FIG. 7A. A navigation route is planned based on the map and localization information, thereby accuracy of the navigation route of the mobile robot and human-computer interaction are improved.

Figure 8:
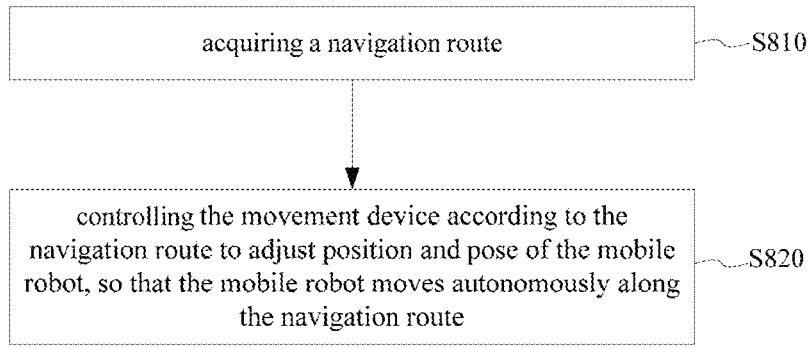
FIG. 8 shows a flow diagram of a control method of a mobile robot of the present application in one embodiment.

Please refer to FIG. 8 which shows a flow diagram of a control method of a mobile robot of the present application in one embodiment. The control method of the mobile robot is applied to a mobile robot containing an image acquisition device and a movement device. The control method is mainly performed by a control system of a mobile robot, and the control system includes a controller which controls the movement device of the mobile robot according to the acquired navigation route, and a transient memory configured to temporarily store intermediate data generated during the control period. Wherein the movement device for example includes a wheel and a driver of the wheel, and the driver can be for example a motor, etc. The controller can be for example an MCU. The transient memory includes but is not limited to a register and a volatile memory.

In step S810, a navigation route is acquired; wherein the navigation route is planned through the navigation method shown in FIG. 5A or FIG. 6A and the related description.

In step S820, the movement device is controlled according to the navigation route to adjust position and pose of the mobile robot, so that the mobile robot moves autonomously along the navigation route. Herein, position information and pose information of the mobile robot are acquired in real time through a mobile sensor arranged on the mobile robot, and the movement device is controlled based on the navigation route, so that the mobile robot moves along the navigation route with a corresponding pose.

In some embodiments, a mobile robot can be controlled to move from the corresponding current position to a corresponding destination position according to a destination position indicated by entity object information on a map marked with entity object information, current position and current pose of the mobile robot on the map acquired by a mobile sensor, and other information on the map such as other object position information or a preset route. For example, the mobile robot can be controlled to move from the current position to a destination position along a route marked on the map, and when the mobile robot needs to make a turn during the process of autonomous movement according to the route, the mobile robot is controlled to rotate, so as to adjust pose of the mobile robot, and then the mobile robot is controlled to move along the following route with an adjusted pose.

In addition, in some embodiments, the mobile robot can also send a moving route, from a corresponding current position to a corresponding destination position, to a terminal device which is in communication with the mobile robot, so as to display the moving route, current position information, destination position information or any combination thereof on the map, which is convenient for users to check. For example, under some conditions, current position of the robot can be presented in real time on the map displayed by the terminal device, and when the destination position is the position where a table is located, text description of "table", an icon corresponding to an image of the table, or a preset number corresponding to the table is shown at the destination position on the map, meanwhile, a moving route from the current position of the mobile robot to the table is displayed on the map. In some other embodiments, through a modification operation on the navigation route displayed on the map, the terminal device modifies a moving route or destination position information, and updates the modification operation to the mobile robot, so that the mobile robot moves according to the modified moving route or destination position information. The modification operation can be a touch operation on a touch screen which displays the moving route and the destination position information, or the modification operation can also be operation instructing the terminal device to receive voice information containing modification instruction. For example, when a mobile robot is passing by a television and moving to a table according to a moving route, a user finds out that an untouchable obstacle exists between the table and the television, then the user modifies the destination position information to be the television, such that the mobile robot stops at the position of the television to avoid collision with the obstacle. When the modification instruction is voice information, it can be for example "modifying the destination position to be a television" herein. In some other embodiments, the modification instruction can also be directly sent to the mobile robot via voice. For example, a voice of "modifying destination position to be a television" is sent to the mobile robot, and destination position of a navigation route of the mobile robot is modified to a television.

In the control method of a mobile robot of the present application, a navigation route about a built map is formed based on the method as shown in FIG. 5A or FIG. 6A, and entity object information is marked on the built map, so as to generate a map marked with entity object information, meanwhile, during movement and control of the mobile robot, destination position contained in user instruction is identified based on entity object information marked on a map, so as to generate a navigation route, and then control the mobile robot to move to the destination position along the navigation route, thereby accuracy of the navigation route of a mobile robot and human-computer interaction are improved.

Figure 9:
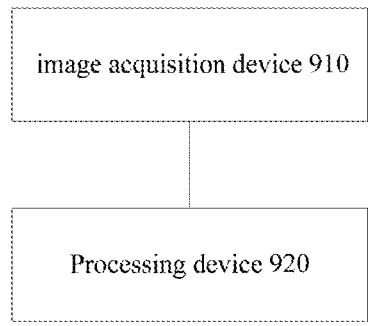
FIG. 9 shows a structure schematic diagram of a system for mapping of the present application in one embodiment.

Please refer to FIG. 9, which shows a structure schematic diagram of a system for mapping of the present application in one embodiment. The system for mapping is used in the mobile robot, the system for mapping includes the image acquisition device 910 and the processing device 920.

The image acquisition device 910 is arranged on the mobile robot, and is configured to capture entity objects within a field of view of the image acquisition device at a position where the mobile robot is located to obtain projected images, the projected images are on a plane which is parallel with a moving plane of the mobile robot; The image acquisition device 910 includes but is not limited to fisheye camera module, wide angle (or non-wide angle) camera module or any of them. The mobile robot includes, but is not limited to, a family companion mobile robot, a cleaning robot, a patrol mobile robot, a glass cleaning robot, etc.

Herein the mobile robot includes at least one image acquisition device 910. The image acquisition device 910 captures entity objects within a field of view of the image acquisition device at a position where the mobile robot is located to obtain projected images, wherein the projected images are on a plane which is parallel with a moving plane of the mobile robot. For example, a mobile robot includes an image acquisition device which is arranged on the top, shoulder or back of the mobile robot, and the principal optic axis of the image acquisition device is vertical to a moving plane of the mobile robot. For another example, a mobile robot includes several image acquisition devices, and the principal optic axis of the image acquisition device 910 is vertical to a moving plane of the mobile robot. And the projected images which are formed by the images, captured by the above-mentioned image acquisition device, projecting onto the moving plane of the mobile robot, are equal to the vertical projection of the images, captured by the image acquisition device, on the moving plane. According to the first projected image captured by the image acquisition device at the first position, the common target region is recognized in the first projected image, and the first angle between the line formed by the first position and the common target region and the line formed when the mobile robot moves from the first position to the second position is obtained. According to the second projected image captured by the image acquisition device at the second position, the common target region is recognized in the second projected image, and the second angle between the line formed by the second position and the common target region and the line formed when the mobile robot moves from the first position to the second position is obtained. Thus the position of the entity object corresponding to the common target region projecting onto the moving plane is obtained according to the distance between the first position and the second position, the first angle and the second angle. And since the image acquisition device is arranged on top of the mobile robot, and a principal optic axis of the image acquisition device is vertical to the moving plane of the mobile robot, the angle between the line formed by the position of the entity object projecting onto the moving plane and the first position of the mobile robot and the line formed when the mobile robot moves from the first position to the second position is equal to the first angle, the angle between the line formed by the position of the entity object projecting onto the moving plane and the second position of the mobile robot and the line formed when the mobile robot moves from the first position to the second position is equal to the second angle. With reference to the description of FIG. 1, it can be known that, a position of an entity object in a projected image captured by the image acquisition device 910 is used to indicate a position where the entity object is projected onto the moving plane of the mobile robot, and an angle of the position of the entity object in a projected image relative to a travelling direction of the mobile robot is used to indicate an angle of the position where the entity object is projected onto the moving plane of the mobile robot relative to the travelling direction of the mobile robot.

The processing device 920 is an electronic device which can perform numeric calculation, logical calculation and data analysis, which includes but is not limited to: CPU, GPU, FPGA and volatile memories configured to temporarily store intermediate data generated during calculations. The processing device 920 connected with the image acquisition device 910 is used to run at least one program to perform the method for mapping. As for the method for mapping, please refer to FIG. 2A and related description of the method shown in FIG. 2A, which will not be repeated here.

Figure 10:
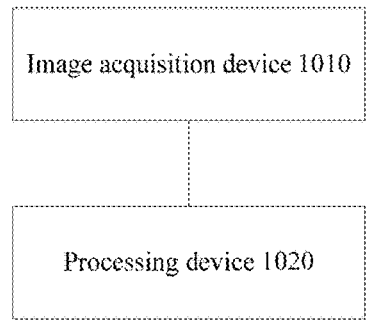
FIG. 10 shows a structure schematic diagram of a navigation system of the present application in one embodiment.

Please refer to FIG. 10, which shows a structure schematic diagram of a navigation system of the present application in one embodiment. The navigation system is used in the mobile robot. The navigation system includes the image acquisition device 1010 and the processing device 1020.

The image acquisition device 1010 is arranged on the mobile robot, and is configured to capture entity objects within a field of view of the image acquisition device at a position where the mobile robot is located to obtain projected images, the projected images are on a plane which is parallel with a moving plane of the mobile robot; The image acquisition device 1010 includes but is not limited to fisheye camera module, wide angle (or non-wide angle) camera module or any of them. The mobile robot includes, but is not limited to, a family companion mobile robot, a cleaning robot, a patrol mobile robot, a glass cleaning robot, etc.

Herein the mobile robot includes at least one image acquisition device 1010. The image acquisition device 1010 captures entity objects within a field of view of the image acquisition device at a position where the mobile robot is located to obtain projected images, wherein the projected images are on a plane which is parallel with a moving plane of the mobile robot. For example, a mobile robot includes an image acquisition device 1010 which is arranged on the top, shoulder or back of the mobile robot, and the principal optic axis of the image acquisition device is vertical to a moving plane of the mobile robot. For another example, a mobile robot includes several image acquisition devices, and the principal optic axis of the image acquisition device 1010 is vertical to a moving plane of the mobile robot. With reference to the description of FIG. 1, it can be known that, a position of an entity object in a projected image captured by the image acquisition device 910 is used to indicate a position where the entity object is projected onto the moving plane of the mobile robot, and an angle of the position of the entity object in a projected image relative to a travelling direction of the mobile robot is used to indicate an angle of the position where the entity object is projected onto the moving plane of the mobile robot relative to the travelling direction of the mobile robot.

The processing device 1020 is an electronic device which can perform numeric calculation, logical calculation and data analysis, which includes but is not limited to: CPU, GPU, FPGA and volatile memories configured to temporarily store intermediate data generated during calculations. The processing device 1020 connected with the image acquisition device 1010 is used to run at least one program to perform the navigation method. As for the navigation method, please refer to FIG. 5A or FIG. 6A and related description shown in FIG. 5A or FIG. 6A, which will not be repeated here.

Figure 11:
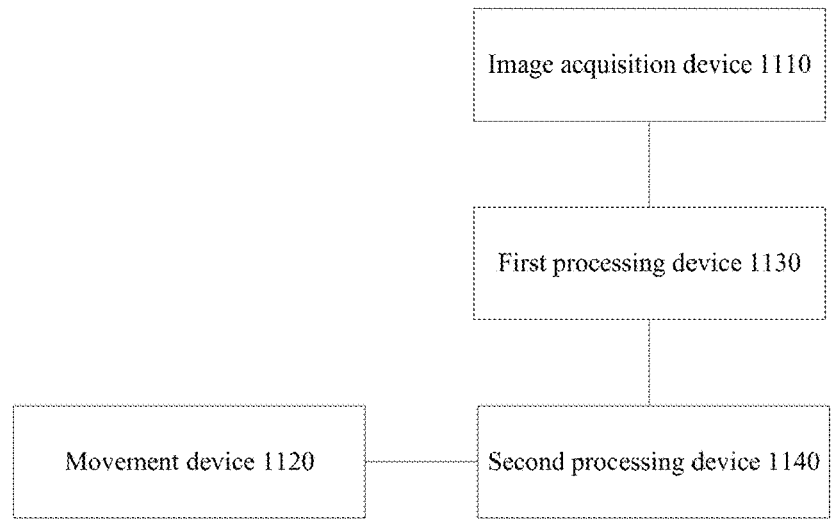
FIG. 11 shows a structure schematic diagram of a mobile robot of the present application in one embodiment.

Please refer to FIG. 11, which shows a structure schematic diagram of a mobile robot of the present application in one embodiment.

The mobile robot includes image acquisition device 1110, the movement device 1120, the first processing device 1130 and the second processing device 1140.

The image acquisition device 1110 is arranged on the mobile robot, and is configured to capture entity objects within a field of view of the image acquisition device at a position where the mobile robot is located to obtain projected images, the projected images are on a plane which is parallel with a moving plane of the mobile robot; The image acquisition device 1110 includes but is not limited to fisheye camera module, wide angle (or non-wide angle) camera module or any of them. The mobile robot includes, but is not limited to, a family companion mobile robot, a cleaning robot, a patrol mobile robot, a glass cleaning robot, etc.

Herein the mobile robot includes at least one image acquisition device 1010. The image acquisition device 1010 captures entity objects within a field of view of the image acquisition device at a position where the mobile robot is located to obtain projected images, wherein the projected images are on a plane which is parallel with a moving plane of the mobile robot. For example, a mobile robot includes an image acquisition device 1010 which is arranged on the top, shoulder or back of the mobile robot, and the principal optic axis of the image acquisition device is vertical to a moving plane of the mobile robot. For another example, a mobile robot includes several image acquisition devices, and the principal optic axis of the image acquisition device 1010 is vertical to a moving plane of the mobile robot. With reference to the description of FIG. 1, it can be known that, a position of an entity object in a projected image captured by the image acquisition device 1010 is used to indicate a position where the entity object is projected onto the moving plane of the mobile robot, and an angle of the position of the entity object in a projected image relative to a travelling direction of the mobile robot is used to indicate an angle of the position where the entity object is projected onto the moving plane of the mobile robot relative to the travelling direction of the mobile robot.

The movement device 1120 is arranged on the mobile robot, and is configured to adjust a position and a pose of the mobile robot in a controlled manner. In some embodiment the movement device 1120 for example includes a wheel and a driver of the wheel, and the driver can be for example a motor, etc.

The first processing device 1130 is connected with the image acquisition device 1110, and is configured to run at least one program so as to perform a navigation method. As for the navigation method, please refer to FIG. 5A or FIG. 6A and related description of the method shown in FIG. 5A or FIG. 6A, which will not be repeated here.

The second processing device 1140 is connected with the first processing device 1130 and the movement device 1120, and is configured to run at least one program so as to control the movement device 1120 to perform the control method based on a navigation route provided by the first processing device 1130. As for the control method, please refer to FIG. 8 and related description shown in FIG. 8, which will not be repeated here.

Figure 12:
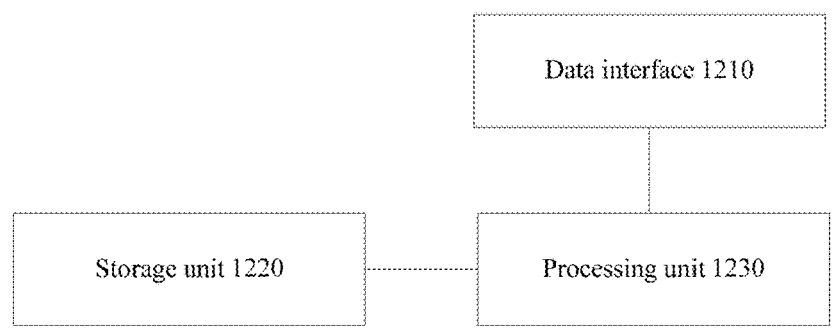
FIG. 12 shows a structure schematic diagram of a data processing device of the present application in one embodiment.

Please refer to FIG. 12, which shows a structure schematic diagram of a data processing device of the present application in one embodiment.

The data processing device is used in the mobile robot including the image acquisition device, wherein the image acquisition device captures entity objects within a field of view of the image acquisition device at a position where the mobile robot is located to obtain projected images, the projected images are on a plane which is parallel with a moving plane of the mobile robot. The data processing device includes data interface 1210, the storage unit 1220 and the processing unit 1230.

The data interface 1210 is connected with the image acquisition device, wherein the image acquisition device captures entity objects within a field of view of the image acquisition device at a position where the mobile robot is located to obtain projected images, the projected images are on a plane which is parallel with a moving plane of the mobile robot. For example, a mobile robot includes an image acquisition device which is arranged on the top, shoulder or back of the mobile robot, and the principal optic axis of the image acquisition device is vertical to a moving plane of the mobile robot. For another example, a mobile robot includes several image acquisition devices, and the principal optic axis of the image acquisition device 910 is vertical to a moving plane of the mobile robot. With reference to the description of FIG. 1, it can be known that, a position of an entity object in a projected image captured by the image acquisition device is used to indicate a position where the entity object is projected onto the moving plane of the mobile robot, and an angle of the position of the entity object in a projected image relative to a travelling direction of the mobile robot is used to indicate an angle of the position where the entity object is projected onto the moving plane of the mobile robot relative to the travelling direction of the mobile robot.

The storage unit 1220 is used to store at least one program.

The storage unit 1220, which is connected with the storage unit 1220 and the data interface 1210, is used to obtain images captured by image acquisition device through the data interface 1210. And the storage unit 1220 is used to run at least one program so as to perform the method for mapping, the navigation method or the control method. For the method for mapping, please refer to FIG. 2A and related description of the method shown in FIG. 2A; for the navigation method, please refer to FIG. 5A or FIG. 6A and related description shown in FIG. 5A or FIG. 6A; for the control method, please refer to FIG. 8 and related description shown in FIG. 8, which will not be repeated here.

In another embodiment of the present application, a computer-readable storage medium is also disclosed. The computer-readable storage medium stores at least one program. And the at least one program performs the method for mapping, the navigation method or the control method when it is invoked. For the method for mapping, please refer to FIG. 2A and related description of the method shown in FIG. 2A; for the navigation method, please refer to FIG. 5A or FIG. 6A and related description shown in FIG. 5A or FIG. 6A; for the control method, please refer to FIG. 8 and related description shown in FIG. 8, which will not be repeated here.

What is claimed is:

1. A mobile robot, comprising:
   an image acquisition device;
   a movement device configured to adjust a position and a pose of the mobile robot;
   a non-transitory computer readable medium having instructions recorded thereon, the instructions when executed implementing a navigation method;
   a first processing device configured to determine a navigation route by executing the instructions; and
   a second processing device configured to control the movement device based on the navigation route;
   wherein the navigation method comprises:
   capturing, using the image acquisition device, a first two-dimensional image of an entity object when the mobile robot is at a first position on a moving plane;
   determining, using the image acquisition device, a first projected image of the entity object, wherein the first projected image is a projection of the first two-dimensional image on the moving plane;
   capturing, using the image acquisition device, a second two-dimensional image of the entity object when the mobile robot is at a second position on the moving plane;
   determining, using the image acquisition device, a second projected image of the entity object, wherein the second projected image is a projection of the second two-dimensional image on the moving plane;
   determining a first angle between a first direction pointing from the first position to projection of the entity object on the moving plane and a moving direction pointing from the first position to the second position, based on the first projected image;
   determining a second angle between a second direction pointing from the second position to the projection of the entity object and the moving direction, based on the second projected image;
   determining a position of projection of the entity object on the moving plane based on the first angle, the second angle, the first position and the second position;
   determining the navigation route based on the position of the projection of the entity object on the moving plane.

2. The mobile robot of claim 1, wherein; the navigation method further comprises:
   identifying target regions corresponding to the entity object in the first projected image and the second projected image respectively based on information of the entity object.

3. The mobile robot of claim 2, wherein identifying the target regions comprises using an image recognition algorithm.

4. The mobile robot of claim 1, wherein the navigation method further comprises:

identifying a first target region corresponding to the entity object in the first projected image;

identifying a second target region corresponding to the entity object in the second projected image based on the first target region, the first position and the second position or identifying the second target region corresponding to the entity object in the second projected image by matching the second projected image to the first target region.

5. The mobile robot of claim 1, wherein the navigation method further comprises determining a change in the pose of the mobile device from the first position to the second position;

wherein determining the position of the projection of the entity object on the moving plane is further based on the change in the pose.

6. The mobile robot of claim 1, wherein determining the position of the projection of the entity object on the moving plane comprises:

constructing a geometrical relationship in the moving plane based on the first angle, the second angle, the first position and the second position; and determining the position of the projection of the entity object in the moving plane according to the constructed geometrical relationship.

7. The mobile robot of claim 1, wherein; the first processing device is further configured to measure characteristics of movement of the mobile robot from the first position to the second position, and to determine the second position based on the characteristics of the movement and the first position.

8. The mobile robot of claim 1, wherein a principal optic axis of the image acquisition device is vertical to the moving plane.

9. The mobile robot of claim 1, wherein the navigation route causes the mobile robot to avoid the position of the projection of the entity object on the moving plane.

10. A mobile robot, comprising:

an image acquisition device;

a movement device configured to adjust a position and a pose of the mobile robot;

a non-transitory computer readable medium having instructions recorded thereon, the instructions when executed implementing a navigation method;

a first processing device configured to determine a navigation route by executing the instructions; and a second processing device configured to control the movement device based on the navigation route;

wherein the navigation method comprises:

capturing, using the image acquisition device, a first two-dimensional image of an entity object when the mobile robot is at a first position on a moving plane;

determining, using the image acquisition device, a first projected image of the entity object, wherein the first projected image is a projection of the first two-dimensional image on the moving plane;

capturing, using the image acquisition device, a second two-dimensional image of the entity object when the mobile robot is at a second position on the moving plane;

determining, using the image acquisition device, a second projected image of the entity object, wherein the second projected image is a projection of the second two-dimensional image on the moving plane;

wherein the first projected image comprises a first target region corresponding to the entity object and the second projected image comprises a second target region corresponding to the entity object;

determining a first angle between a first direction pointing from the first position to projection of the entity object on the moving plane and a moving direction pointing from the first position to the second position, based on the first projected image;

determining a second angle between a second direction pointing from the second position to the projection of the entity object and the moving direction, based on the second projected image;

determining the second position based on the first angle, the second angle and the first position; and determining the navigation route based on the second position.

11. The mobile robot of claim 10, wherein, the navigation method further comprises:

identifying the first target region and the second target region based on information of the entity object.

12. The mobile robot of claim 11, wherein identifying the target regions comprises using an image recognition algorithm.

13. The mobile robot of claim 11, wherein the navigation method further comprises:

identifying the first target region;

identifying the second target region based on the first target region, the first position and the second position or identifying the second target region by matching the second projected image to the first target region.

14. The mobile robot of claim 10, wherein; the navigation method further comprises determining a change in the pose of the mobile device from the first position to the second position;

wherein determining the second position is further based on the change in the pose.

15. The mobile robot of claim 10, wherein determining the second position comprises:

constructing a geometrical relationship in the moving plane based on the first angle, the second angle, and the first position; and determining the second position according to the constructed geometrical relationship.

16. The mobile robot of claim 10, wherein the first processing device is further configured to measure characteristics of movement of the mobile robot from the first position to the second position, and to determine the second position based on the characteristics of the movement and the first position.

17. The mobile robot of claim 10, wherein determining the navigation route that leads the mobile robot to the entity object, causes the mobile robot to pass by the entity object or causes the mobile robot to avoid the entity object.

* * * * *